United States Patent
Kuhn et al.

(10) Patent No.: US 6,297,845 B1
(45) Date of Patent: Oct. 2, 2001

(54) SYSTEM AND METHOD OF IN-SERVICE TESTING OF COMPRESSED DIGITAL BROADCAST VIDEO

(75) Inventors: Karl J. Kuhn, Haymarket; John Mark Zetts, Falls Church, both of VA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/221,865

(22) Filed: Dec. 29, 1998

(51) Int. Cl.$^7$ ................................................. H04N 17/00

(52) U.S. Cl. .................... 348/192; 348/180; 348/194; 370/352; 370/401

(58) Field of Search ................................ 348/180, 192, 348/193, 194; 370/389, 351, 352, 241, 401; 725/107, 114, 116, 119, 143

(56) References Cited

U.S. PATENT DOCUMENTS

| | | | |
|---|---|---|---|
| 5,627,836 | * 5/1997 | Conoscenti et al. | 370/397 |
| 5,677,905 | * 10/1997 | Bigham et al. | 370/94.2 |
| 5,764,626 | * 6/1998 | VanDervort | 370/232 |
| 5,812,528 | * 9/1998 | VanDervort | 370/235 |
| 5,920,626 | * 7/1999 | Durden et al. | 348/6 |

* cited by examiner

Primary Examiner—Reinhard J. Eisenzopf
Assistant Examiner—Trang U. Tran
(74) Attorney, Agent, or Firm—Joseph C. Redmond, Jr.; Morgan & Finnegan, LLP

(57) ABSTRACT

A switched digital video broadcast network provides in-service testing of digitized broadcast video signals subject to analog-to-digital and digital-to-analog conversion. The network includes a plurality of gateways, each gateway coupled to video signal sources and sink. Video frames transmitted on the network are subject to analog-to-digital and digital-to-analog conversion and compression in an MPEG 2 encoder/decoder. Each gateway and includes a test pattern generator and test measurement analyzer for in-service testing of the video signals. The test pattern generator inserts a test signal on pre-selected lines (22, 23 or 261,262) in a Video Blanking Interval (VBI) and time periods of a video frame. The test signal may be dynamically placed at any location in the frame using concealment techniques The video lines are not seen by television viewers. The test pattern generator and test measurement analyzer are synchronized using vertical integral time code and a trigger packet sent by the transmitting station. The test signals enable both in-service and out-of-service testing to be performed for the entire suite of EIA/TIA 250C standard video tests.

21 Claims, 24 Drawing Sheets

CBS: wwinston            Order Reservation                                    Print  [X]

Reservation ID: 1A5E   Reservation Status: Confirmed  ⎯630
Title: [Evening News]                                        ☐ Recurring Event
Start Date: [02][04][98]  Start Time: [19][00]              [X]
             month day year  (EST)    hours mins
Stop Date:  [02][04][98]  Stop Time:  [19][30]              ○ Every ☐ Day
             month day year  (EST)    hours mins            ○ Every ☐ Day
Origin Port: Telco #: Local Loop: Duration: 00:30:00 ⎯625
[NYAC89]    [945573]  [TV1XU3]
Dest. Port:  Telco #: Local Loop:      ☐ Insurance
[WASACB2]   [968843]  [TV1ASD]         [X]
                                       mins
                                                    Format:  [NTSC Analog]
Comments: [Primary feed out of New York]            Profile: [4:2:0]

[Submit]  [Quit]
                                  ⎯640

X Represents luminance samples
O Represents chrominance samples

FIG. 6A
PRIOR ART

X Represents luminance samples
O Represents chrominance samples

FIG. 6B
PRIOR ART

SYSTEM AND METHOD OF IN-SERVICE TESTING OF COMPRESSED DIGITAL BROADCAST VIDEO

RELATED APPLICATIONS

Copending applications entitled "System and Method of Automated Testing of a Compressed Digital Broadcast Video Network", Ser. No. 09/221,864, Filed Dec. 29, 1998 (BC9-98-078), and "Apparatus and Method of i-Service of Audio/Video Synchronization Testing", Ser. No. 09/221,868, Filed Dec. 29, 1998 (BC9-98-103), both assigned to the same assignee as that of the present invention and fully incorporated herein by reference.

BACKGROUND OF THE INVENTION

1. Field of the Invention

This invention relates to video data transmission systems. More particularly, the invention relates to systems and methods of in-service testing of compressed digital broadcast video.

2. Prior Art

In video transmission networks the Motion Picture Expert Group (MPEG) 2 compression algorithm and ATM networks can cause perturbations in video transmission signals that are not normally seen in an analog only network. To detect network anomalies and failures real-time, inservice circuit testing is performed so that service may be restored with minimum circuit outage. The technique of EIA/TIA 250 C in-service testing is well-known in the television industry. Broadcasters have historically used the Video Blanking Interval (VBI) lines 10–20 of both fields to insert test signals. Also embedded in the VBI are closed caption text and Society of Motion Picture and Television Engineers (SMPTE) time codes. The VBI is not part of the active video area and, therefore, is not seen by viewers.

MPEG-2 video encoders however preclude in-service testing because the encoder filters VBI lines 1 through 21 exclusive of each screen or frame in order to reduce the transmitted bandwidth. The video encoder copies the SMPTE time code into the Group Of Pictures (GOP) header and the closed caption text is passed as user data in the MPEG-2 transport stream. The test signals are ignored. At the receiving end, the VBI lines are regenerated by the MPEG-2 decoder and the SMPTE time codes and closed captions text are reinserted, however, the VBI is devoid of any test signal. Thus, in-service testing is limited to (1) synchronization pulse amplitude test and (2) chrominance burst amplitude test which basically confirm the presence or absence of video. These tests are incapable of measuring or assessing video quality.

The MPEG-2 video encoder limitation also encumbers broadcasters which often seek to insert test signals into the VBI at the point of signal origination to test end-to-end video quality. If their video transmission undergoes MPEG-2 to compression at any stage, the VBI test signals are lost.

Prior art related to in-service testing of video transmission systems includes:

U.S. Pat. No. 5,617,148 issued Apr. 1, 1997, filed Sep. 18, 1992 (Montgomery), discloses a controlled element for spectrum attenuation or a controlled filter used to aid in the insertion of a secondary signal into a video signal without distorting the blanking intervals or closed caption data contained in the blanking interval of the video signal.

U.S. Pat. No. 4,969,041 issued Nov. 6, 1990 (O'Grady), discloses data embedded in a video signal by adding a low level waveform to the video signal. The low level waveform has a level below the noise level of the video signal and corresponds to the data. To detect the data embedded in the video signal, the video signal is correlated with low level waveform corresponding to the data to produce a correlation coefficient. A high correlation coefficient indicates a presence of a low level waveform which is converted into data. The low level waveform extends over many video lines so that it does not occur at or near the same location within a video frame for many frames to avoid fixed pattern noise anomalies that may be detected by a viewer.

U.S. Pat. No. 5,585,858 issued Dec. 17, 1996, filed Apr. 15, 1994 (Harper), discloses a system for simulcasting a fully interactive program with a normal conventional program in the same standard video signal bandwidth. Unused lines of the video are preferably used for embedding additional interactive response audio channels and graphics and control data. Alternatively, interactive audio segments are provided either serially or one after another in the audio subcarrier or in cable frequency guardbands or pre-stored in memory at the interactive program box. More audio and graphics can be provided through the use of an external storage device or game cartridges. The additional data is entered at designated trigger points in the system through the use of overlaid logic sent down in embedded codes in the signal or resident in the software at the receiver location.

U.S. Pat. No. 5,572,247 issued Nov. 5, 1996, filed Jun. 14, 1991 (Montgomery), discloses signal processors for permitting the transparent reception of a data signal in the video bandwidth of a cable television system. The received signal has video and data components that are frequency interleaved in the video bandwidth in the active video interval. The data signal is modulated with a carrier at a non-zero multiple of a horizontal scanning rate of the video signal. The receiver selects a forward channel transmitting the combined signal responsive to a control signal and extracts the data portion of the transmitted combined signal.

U.S. Pat. No. 5,557,333 issued Sep. 17, 1996, filed Feb. 24, 1994, and U.S. Pat. No. 5,327,237 filed Jun. 14, 1994 (Jungo), discloses signal processes for permitting the transparent, simultaneous transmission and reception of a secondary data signal with a video signal in the video band. The signal processor in the transmitter rasterizes the data at the horizontal scanning rate and modulates the data with a data carrier at a non-integral multiple of the horizontal scanning rate to obtain frequency interleaving. The data is transmitted during the active video portion of each video line.

U.S. Pat. No. 5,663,766 issued Sep. 2, 1997, filed Oct. 31, 1994 (Sizer), discloses a system for communicating digital information in a video signal and comprising an encoder arranged to add a carrier signal modulated by digital information to the video signal. The modulated carrier signal at other than a frequency corresponds to a peak in the video spectrum. A receiver is arranged to optically sense the video signal and to recover the encoded digital information in the video signal.

In view of the prior art, a need exists to provide in-service testing of video transmission subject to the MPEG-2 compression algorithm where a video test signal may be inserted within the VBI or overscan or active area of a video frame for measuring or assessing video quality in a manner transparent to a viewer.

SUMMARY OF THE INVENTION

An object of the invention is a system and method of in-service testing of video transmission subject to MPEG compression.

Another object is the method of inserting a test signal in a video transmission for assessing video quality wherein the transmission is subject to MPEG-2 compression.

Another object is a system and method of concealing a video test signal in a video transmission in a manner that renders the testing transparent to a viewer.

Another object is a system and method to dynamically position a video test signal within the active viewing area of a base video transmission based on the content of the video broadcast.

Another object is a system and method for removing a video test signal from the video blanking interval and periodically injecting the test signal into the active video area of a video transmission to circumvent MPEG-2 video encoder filtering.

Another object is a system and method for extracting a test signal from the active video area of a transmission and placing the test signal into a newly created video blanking interval.

Another object is a system and method to generate a continuous test signal in a restored video blanking interval while receiving an intermittent test signal of varying periodicity.

These and other objects, features and advantages are accomplished in a video transmission system including a command and control operations center (CAC) coupled to a wide area TCP/IP network for remotely controlling local video station. Each station is coupled to an Asynchronous Transfer Mode (ATM) network through gateways as Points Of Presence (POP). Each POP interfaces with the network via an ATM switch. At the origin POP, subscriber video feeds are routed to an analog video switch which is coupled to Vertical Interval Test Signal (VITS) generator and a signal analyzer. The switch is connected through MPEG-2 encoders to a multiplexer which multiplexes the output of the MPEG-2 encoders into a single OC-3 video transport stream of pictures occurring in a series of I, B and/or P fiames for delivery to the ATM switch. To test video quality, the VITS generator sends a NTSC color bar test pattern to the remote POP. The test signal is placed into the Video Blanking Interval (VBI) of a frame without affecting the active video. The modified digital stream is passed to a MPEG video encoder for encoding. A test signal injection controller builds a trigger data packet that is sent downstream to a test signal extractor. Each trigger packet is transmitted twice as a precaution in case a CRC error is detected. The trigger packet is stored in a VBI test signal table. The test signal is placed outside the viewing area using concealment techniques. Video logic determines the concealment of the test signal. The over-scanned area of a frame is tested to determine whether there is available space for the test signal. If so, a line is chosen and a concealment mode is calculated. If the over-scanned area is full, all available safe action lines are ranked by motion and content. Test signals already inserted reduce the number of available lines and the line separation parameter removes other lines from consideration to prevent test signals from being juxtaposed. A concealment score is calculated for each line. The safe lines are ranked by concealment score. If the top score is greater than the predetermined quality threshold, the line, mode and score are returned. Else, the available title safe lines are ranked according to motion content score. Scoring is weighted towards lines devoid of content and lines with static motion. Then, synchronously with the presentation of each frame, a test signal from the test signal store is inserted into the video blanking area for each active video blanking interval line entry. The test signals in the active video area are concealed by the insertion of a video line retrieved and built from a picture stored according to the concealment mode contained in the trigger packet. The repaired video line is forwarded for digital-to-analog conversion. The test signal injection controller determines when and where to inject the test signal into the digital video transport stream. At the receiving end, the analog switch switches the output into the test signal analyzer for measurement and analysis. A time code associated with a frame is matched to the current frame. The entry is removed from an extractor Test Signal Trigger Table and a flag is set in a VBI Line Table. During frame reconstruction, the test signal extractor loops through the active VBI table entry and inserts the stored test signal. If a conceal flag is set, the frame currently being processed is moved out of the current picture into a test signal line. The test is then copied from a signal line store into a target VBI line field of the current picture. If the current frame contains a conceal flag, the video line is concealed. A concealed mode in the VBI table is decoded. The line containing the test signal is repaired using the next line above and below the line needing repair. Thus, in-service testing is accomplished in digital compressed video using concealed video test signals inserted into the video blanking area of an I frame where the concealed test signals are identified by an extractor test signal trigger table and an extractor VBI line table during frame re-construction of the I frame.

DESCRIPTION OF THE DRAWING

The invention will be further understood from the following description of a preferred embodiment taken in conjunction with the appended drawing, in which:

FIG. 4 is a representation of a bandwidth reservation order by a video subscriber for a future video transmission

FIGS. 6A and 6B are prior art illustrations of MPEG-2 sampling formulas 4:2:2 and 4:2:0 sampling formats, respectively.

DESCRIPTION OF PREFERRED EMBODIMENT

Figure 1:
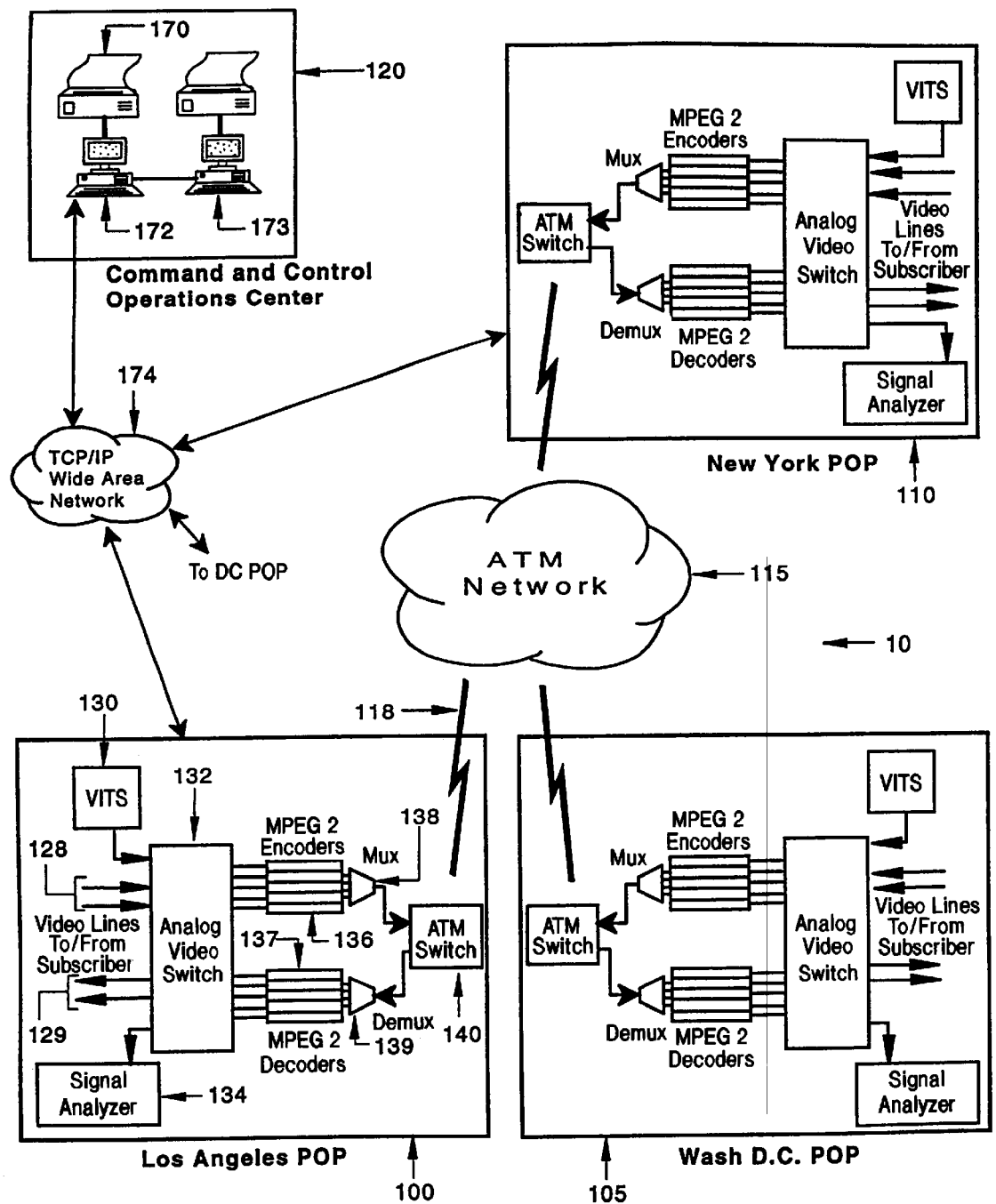
FIG. 1 is a representation of a Command and Control facility (CAC) serving Point-Of-Presence (POP) locations and incorporating the principles of the present invention.

FIG. 1 depicts a video transmission system 10 including three points-of-presence (POP) or gateways 100, 105 and 110 coupled to an Asynchronous Transfer Mode (ATM) network 115 for transmitting high bandwidth, broadcast video to a gateway(s) by digitizing and compressing the analog digital signals. The digitized signal is converted back to analog at the receiving gateway and passed to subscribers. A Command and Control Center (CAC) 120 remotely controls the POP gateways.

The POP gateways are connected to the ATM network through OC-3 (155 Mbps) access lines 118 from an ATM switch 140. A POP gateway has a set of access lines 128, 129 that carry the analog video signal to/from subscribers. The access lines are connected to an analog switch 132 that allows the lines to be switched into dedicated MPEG-2 encoders 136, 137. The POP gateway interfaces with the ATM network via an ATM switch 140. On the transmit side, the ATM switch is connected to a multiplexer (mux) 138 which multiplexes the output of the MPEG-2 encoders into a single OC-3 transport stream. To test video quality of each newly established video circuit, a vertical interval test signal (VITS) generator 130 and a signal analyzer are wired into the switch 132.

Network data that is addressed to a POP gateway is routed into a demultiplexer 139 that demultiplexes the OC-3 data into individual MPEG-2 transport streams. The output subscriber lines 129 provide the signal to the subscriber.

The CAC establishes and removes video connections by commands issued under program control of software executives executing in computers 172, 173. These computers maintain continuous connection to each POP gateway over a TCP/IP wide area network 174 to control the POP equipment and monitor alarm conditions.

Figure 2:
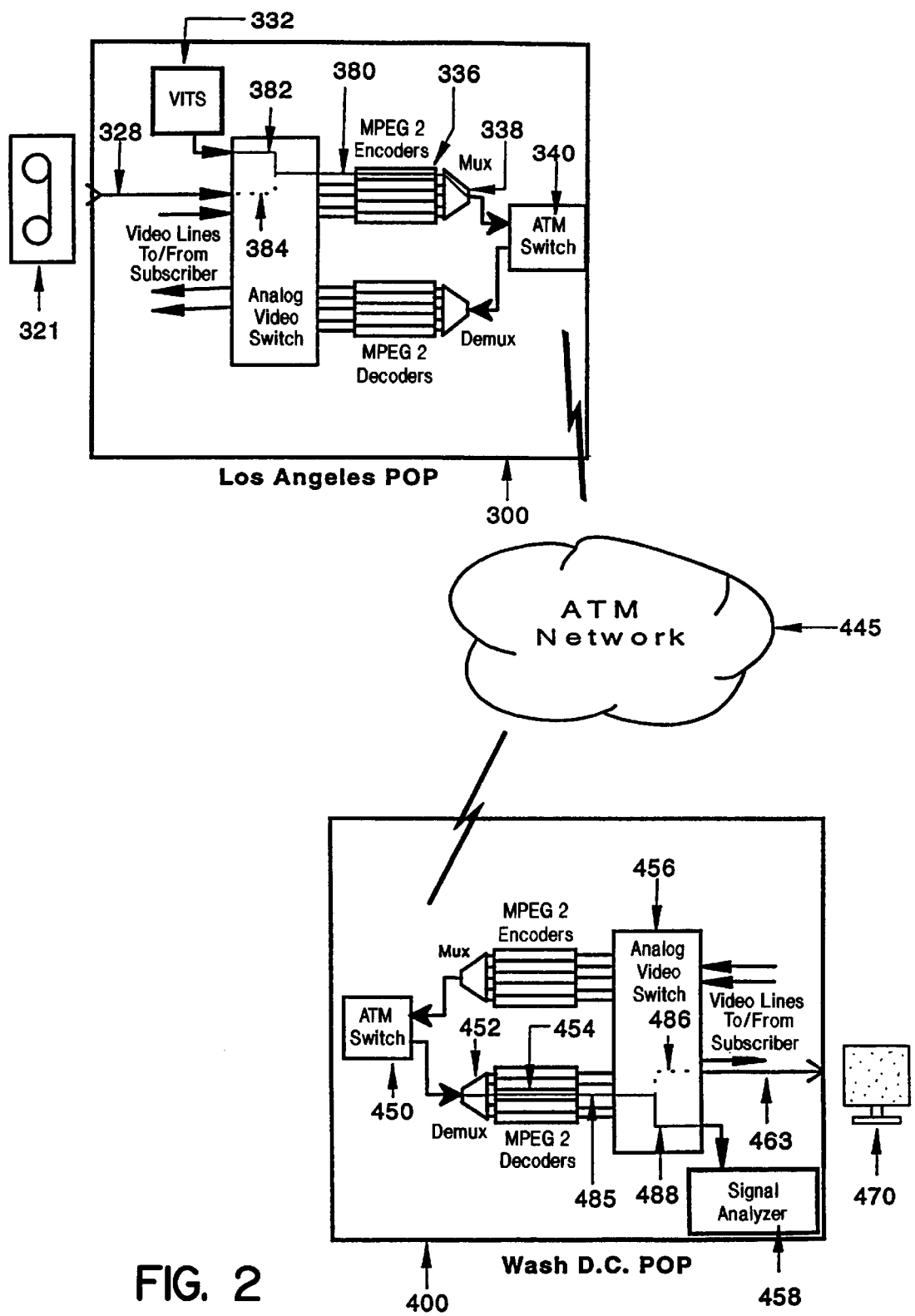
FIG. 2 is a representation of a video in-service test signal generator at a first POP and a test signal analyzer in a second POP included in the system of FIG. 1.

FIG. 2 depicts a typical video connection from a POP gateway in Los Angeles 300 to a POP gateway 400 in Washington, D.C. The gateway 300 provides analog video from a video tape recorder 321 on a customer's private access line 328. The signal 380 is routed by an analog switch 382 into the first available MPEG-2 encoder 336. The signal continues on a multiplexer 338 where it is given an ATM address that permits it to be properly routed by the ATM switch 340 and ATM network 445. At the receiving POP 400, the demultiplexer 452 demultiplexes the aggregate OC-3 signal receiving from the ATM switch 450 and routes the demultiplexed MPEG-2 transport stream 453 into the dedicated MPEG-2 decoder 454. The analog video output of the MPEG-2 decoder is passed to the analog switch 456 which switches the signals into the customers private access lines of 463 for viewing on a video monitor 470.

Immediately after establishing a connection, but prior to switching the subscriber lines 328,463 into the connection path 380,485, the video test equipment 332 is switched 382 into the connection to send a NTSC color bar test pattern to the distant end 400. At the receiving end 400, the analog switch 456 switches the output of the video connection 453 into the test signal analyzer 458 for measurement and analysis. After a test duration of a few seconds, the test equipment is switched out and subscriber lines into an active connection and the circuit is turned over to the subscriber. If the color bar tests had failed, the circuit would have been deactivated and a new video connection would have been established using an entirely different set of network resources. The new connection would then be tested prior to release to the subscriber.

Figure 3:
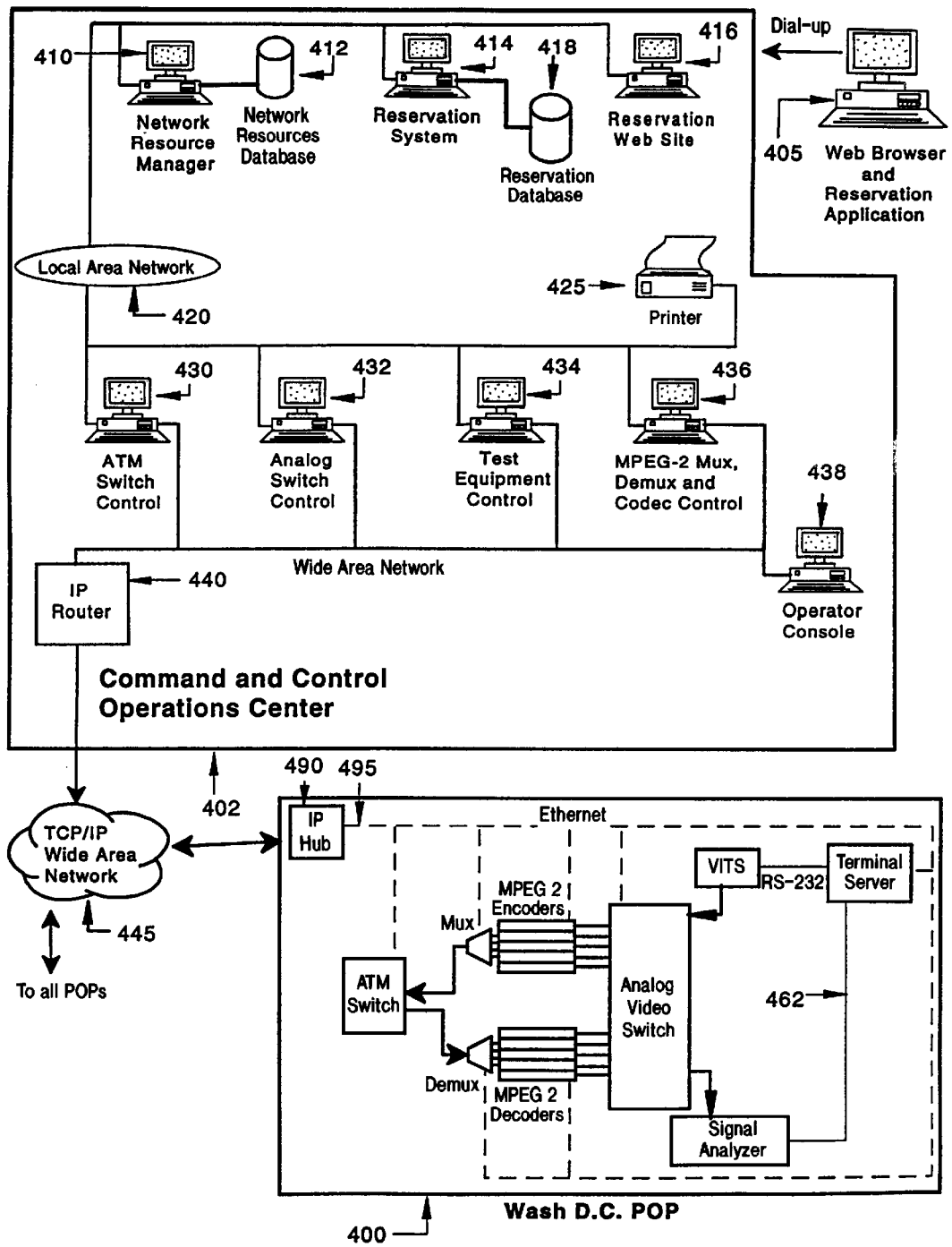
FIG. 3 illustrates the components of a CAC center of FIG. 1.

FIG. 3 illustrates the components of the CAC center 402. The CAC maintains a database 418 of each subscriber reservation. The subscriber makes a reservation for video circuits from his/her computer 405 which is configured with a web browser. After connecting to the reservation web server 416, the subscriber is printed with a web page that solicits reservation data. A reservation request is passed on to system 417 which then queries the network resource manager 410 to ensure that there are adequate resources in the network to establish the circuit at the requested time. The resource manager 410 in turn queries the Network Resource Database 412 to check the availability of access lines, encoders, and decoders, and network bandwidth. If neither resources will be available to honor the future connection, the Network Resource Manager updates resource database and responds affirmatively to the reservation system 414 which then updates its reservation database 418. The reservation web server 416 informs the subscriber of a confirmed reservation by refreshing the reservation request web page.

FIG. 4 illustrates a reservation order web page 600 to which a subscriber reserves bandwidth for a future video transmission. The subscriber enters a start date and time 605 and the end date and time 610 of the connection. Also specified are origins 615 and destination 620 POP locations. Upon submission, 640 of the reservation, the web page is updated with the computed duration 625 of the connection, a reservation status of confirmed 630 and the unique reservation ID 650 with which to reference the reservation in future transactions.

Returning to FIG. 3, in addition to accepting new reservations, the Network Resource Manager 410 creates new video connections at the requested time and destroys connections when the reservation expires. This process is done by issuing commands to a set of program executives that control the ATM switches 430, analog video switches 432, video test sets 434, and MPEG-2 equipment 436. These program executives in turn issue hardware specific commands to slave equipment over a Wide Area Network 445 that is accessed through an IP router 440. Each executive runs in a separate computer with a user console that permits network operators to take manual control of the POP equipment if operator intervention is deemed necessary. However, control of the entire network is fully animated under the control of the network resource manager 410. As each executive issues commands, detects POP alarm conditions, network status is updated at the operator's console 438 and printer 425 which are continuously monitored by the network operators.

Each POP is configured with an IP hub 490 that is the gateway to the network 445. From the hub, Ethernet lines 495 are connected to each set of networking equipment and the terminal server 462. The terminal server permits the test equipment controller 432 to remotely control and monitor all test signal generators and measurement sets via an RS-322 control interface from a wide area IP network 174. The present invention is incorporated as an adjunct to MPEG-2 video encoder/decoder system. MPEG-2 is described in Motion Pictures Expert Group (MPEG) Standard, Coding of Moving Pictures and Associated Audio ITU Recommendation H.262, which is incorporated herein by reference. Some pertinent aspects of MPEG-2 compression will be reviewed in order to facilitate an understanding of the invention.

Figure 5:
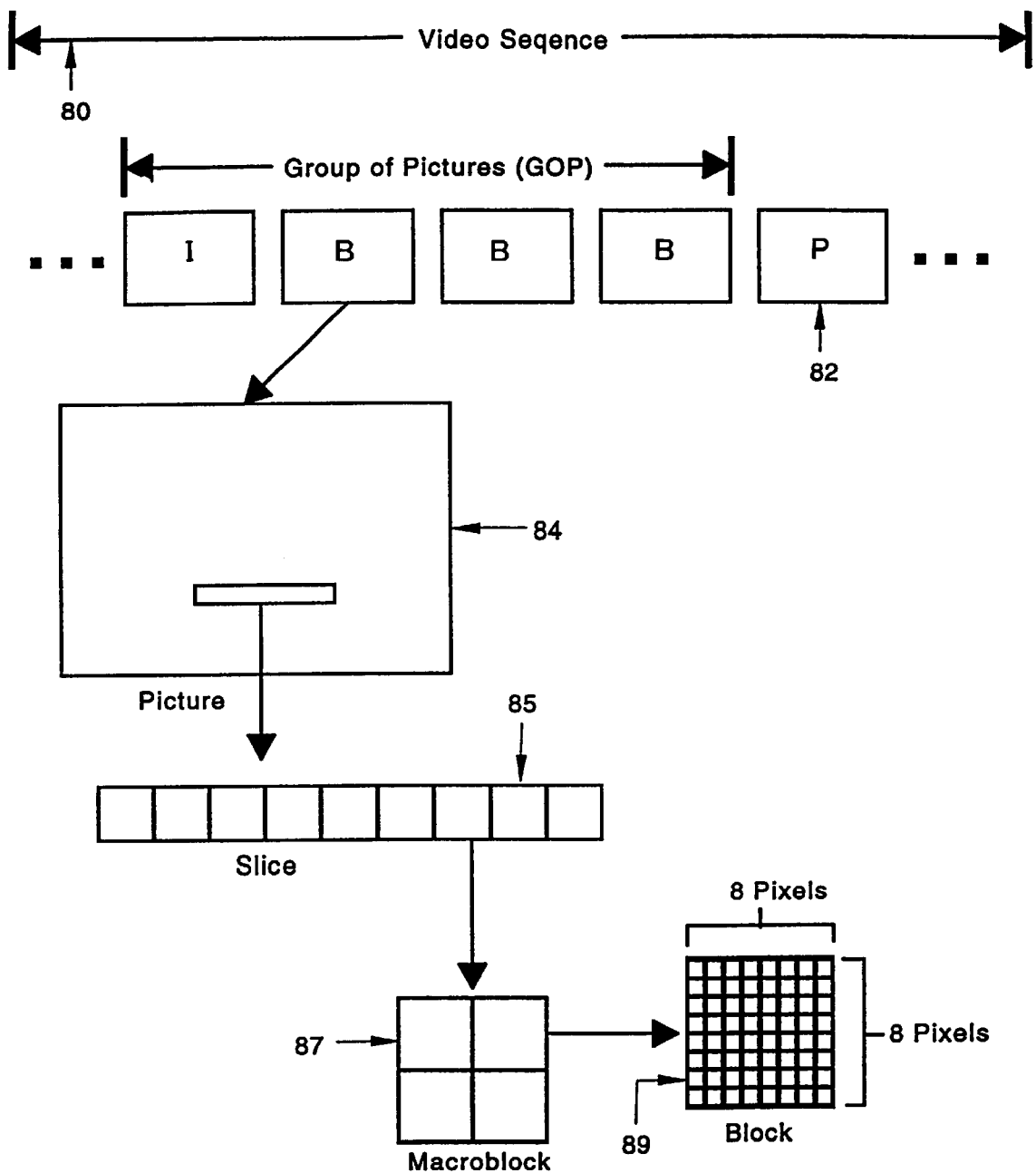
FIG. 5 is a prior art illustration of an MPEG-2 video layer hierarchy.

FIG. 5 is a prior art illustration of an MPEG-2 video layer hierarchy. In FIG. 5, a MPEG-2 data stream consists of a video stream and an audio stream which are packed together in a system's streams. There are other layers within the video stream. The highest layer is a video sequence layer 80 which contains information pertaining to the entire sequence. The video sequence 80 is divided into Groups of Pictures (GOP) 82 which comprise one or more video frames. Video frames, the odd and even fields interlaced to make a 525 line frame, make up the third or picture layer 84. Pictures are further divided into slices of horizontal sections 85. The slice layer is made up of consecutive macro blocks 87 which are built from 8×8 pixels blocks 89, the lowest layer.

In FIGS. 6A and 6B, MPEG-2 encoding uses either 4:2:0 or 4:2:2 format which referred to the type of sampling used to encode the luminance (Y) and chrominance (CrCb) video components. In FIG. 6A, 4:2:2 or 4:2:0 format sampling provides 2 Cr and 2 Cb samples for every four samples of luminance. The CrCb samples are reduced to 1 each in the 4:2:0 format. The location of the single CrCb with respect to the Y sample is shown in FIG. 6A. A superior result is obtained in using 4:2:2 sampling when compressed at a rate of 15 Mbps and higher as shown in FIG. 6B. MPEG-2 encoders supporting 4:2:2 sampling format became available in 1998.

Returning to FIG. 5, within a GOP there are three types of pictures: I or intra-frame; P or predictively motion compensated frame; and B or bi-directionally motion compensated frames. B-frames are the smallest size picture since they are encoded using motion estimations from both the previous and the next I or P-frame. P-frames are predicted from the previous I- or P-frames and they are larger in size. I-frames are coded independently and they are much larger.

A GOP series of frames begins with an I-frame. The I-frame is followed by a series of B and/or P-frames. The more B-frames that are used, the more efficient the compression at a price of reduced video quality. The IBP sequence is a video encoder configuration parameter set by the user according to the requirements of an application. I-frames may be automatically generated for a scene change or when motion compensation cannot be effectively used.

Figure 7:
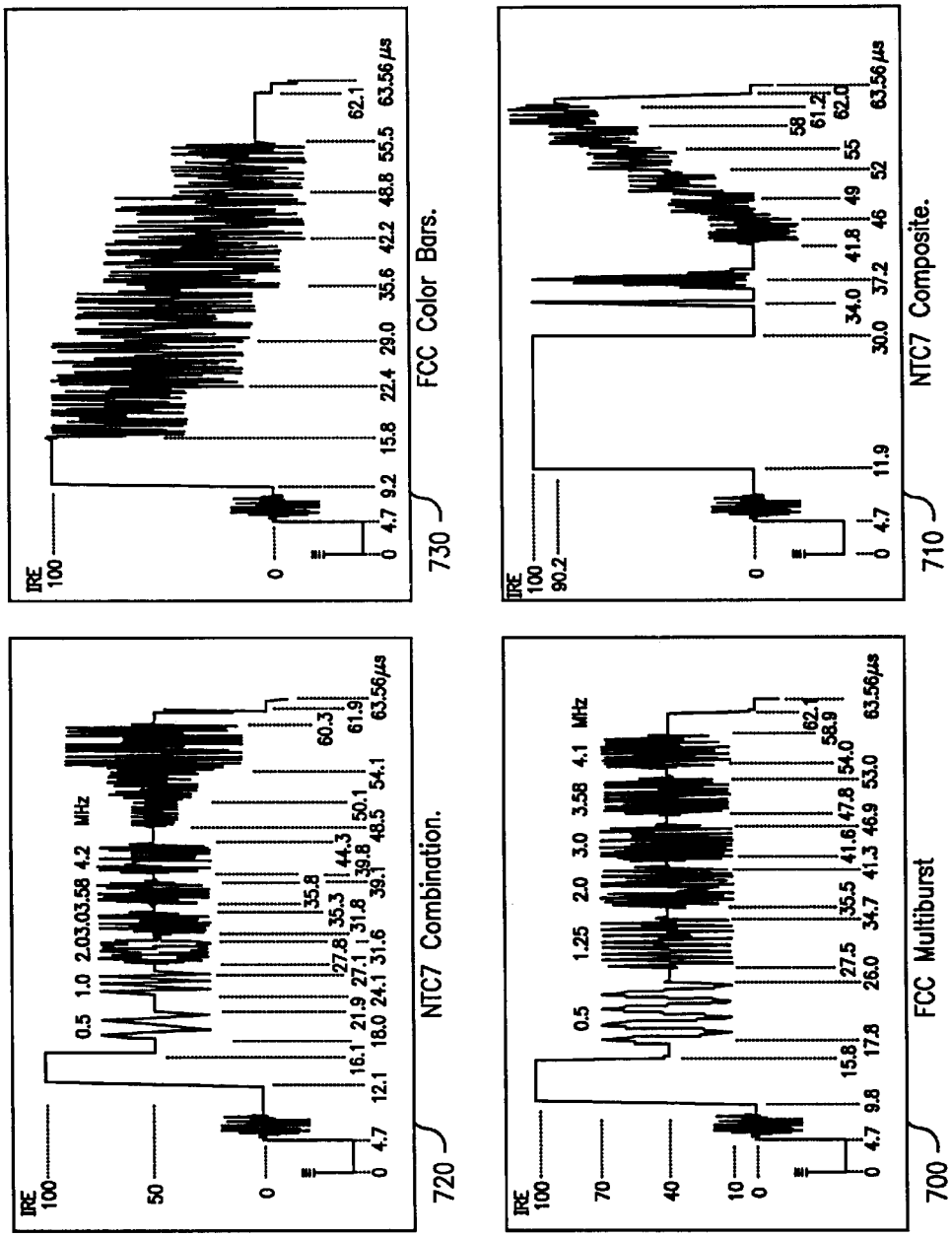
FIG. 7 illustrates a few of the well-known television test signals used to test video performance and quality over transmission systems.

FIG. 7 illustrates a few of the well-known television test signals used to test video performance and quality over transmission systems. FCC multiburst 700 provides test signal for frequency response. NTC7 Composite 710 allows amplitude and phase measurements. NTC7 combination 720 provide frequency response and distortion testing. FCC color bars 730 provide amplitude and timing measurements. One or more of these test signals may be placed into a video blanking interval for in-service testing as will be described hereinafter.

Figure 8:
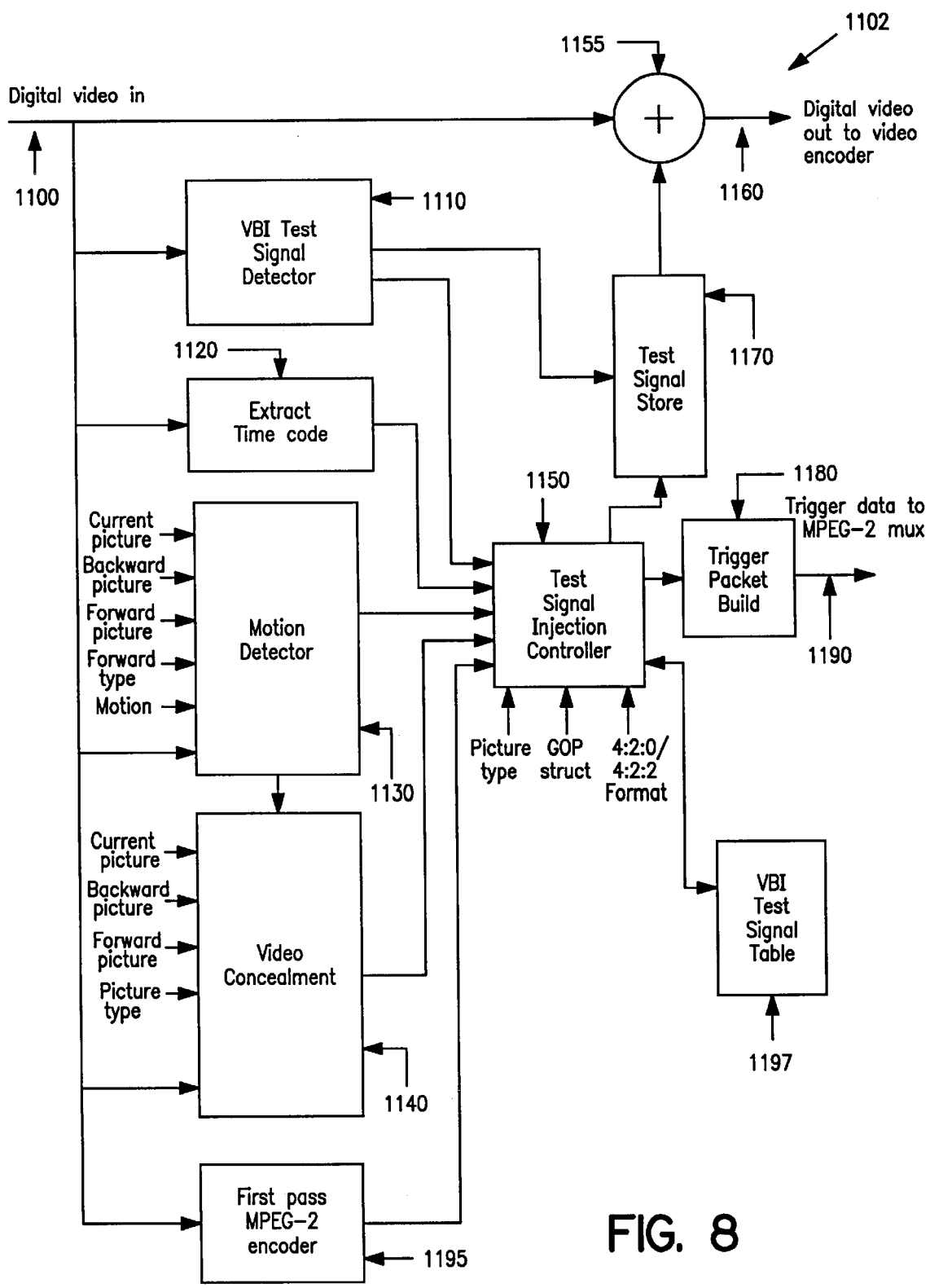
FIG. 8 illustrates a block diagram of a test signal injector 130 shown in FIG. 1.

Test Signal Injector Operation:

FIG. 8 illustrates a block diagram of a test signal injector 1102. A video signal input 1100 is processed to monitor the SMPTE time code and the VBI of each frame and detect the presence of VBI video test signals 1110. Any non-black signal in VBI lines 10 through 20 of either field is treated as a test signal. As test signals are detected, they are stored in test signal store 1170. The motion detector 1130 examines the incoming video for motion and scene change while the video concealment 1140 compares the video lines from the current frame with lines from the prior and next frame. The individual video lines are scored by completeness of the repair. In order to accurately score the concealment results that will take place in the downstream extractor to the video that has been compressed and decompressed, it is necessary to compress and decompress the signal in the injector and process the current, forward and backward picture store. A MPEG-2 video encoder 1195 is used as a quasi-pass encoder for the purposes of obtaining the picture stores of predicting I-frame generation. This will be described in more detail hereinafter.

The test signal injection controller 1150 determines when and where to inject 1155, the test signal, into the digital video stream 1100. The modified serial digital video 1160 is then passed on to the MPEG-2 video encoder for encoding. The controller 1150 also builds a trigger data packet 1180 that is sent downstream to alert a TS extractor (see FIGS. 16/17) of the incoming I-frame for obtaining a test signal. The VBI test signal table 1197 stores injection controller state data.

Figure 9A:
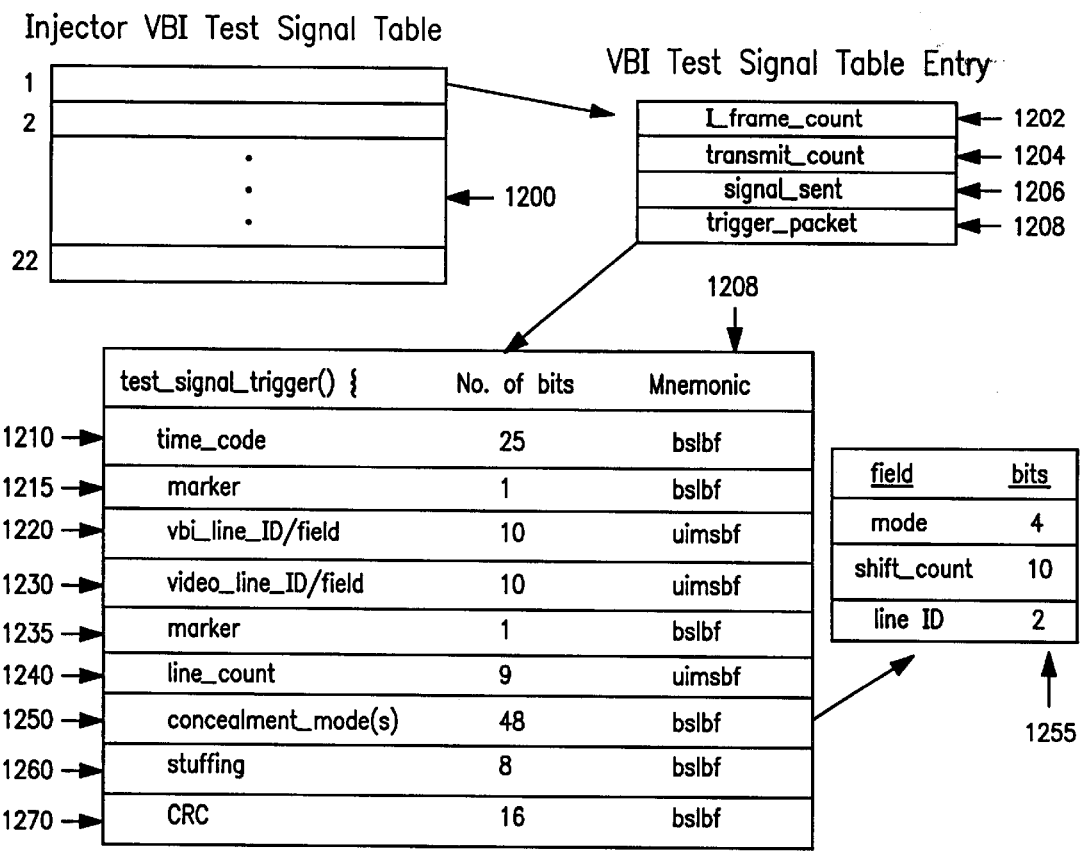
FIG. 9A is a representation of a test signal trigger data structure.

In FIG. 9A an injector trigger packet is stored in VBI test signal table 1200 which also contains a transmit_count 1204 to ensure the packet is transmitted twice, and an I-frame_count 1202 that tracks the number of times an I-frame was sent without an inserted test signal. During times of high scene changes or when it is deemed that concealment would not be effective, no test signals is inserted into the I-frame. This has no effect on the output of the TS extractor because the TS extractor continues to repeat the test signal on the VBI line. Up to three consecutive I-frames may be skipped without consequence. After the extractor sees four consecutive I-frames without a test signal, it drops the test signal and restores the VBI line to black. The signal sent flag 2206 indicates the TS extractor has processed at least the I-frame with an injected test signal.

The injector test signal trigger packet 1200 is diagrammed in table 1208. A timecode 1210 of the modified I-frame is passed in the first field. The timecode is the same value and format as the timecode found in the GOP header preceding the I-frame. Markers 1215 and 1235 are placed within the data structure to preclude start code emulation per the MPEG-2 specification. The next two fields are the VBI_line_ID/field 1220 from which the test signal was taken and the video_line_ID/field 1230 to which it was moved. A line_count 1240 is passed indicating one or three lines were used to transmit the test signal. Three lines are used in 4:2:0 format. The recommended concealment_mode 1250 is also sent to optimize the repair of the usurped video line. The concealment_mode field stores up to three concealment_mode values (3×16 bits) to facilitate the repair of three lines in 4:2:0 mode. Each concealment_mode value 1255 is a 16-bit structure that contains the conceal mode, a pixel shift count, and the lines used to form the repair. The entire data packet is protected by CRC 1270 for error detection. The packet is sent as PES_private_data which are 128 bits of private data available in the PES header. The stuffing field 1260 used to pad out the data blocks to 128 bits. In the event that there are multiple test signals present in the VBI, a separate trigger packet is generated for each one.

Each trigger packet is transmitted twice as a precaution in case a CRC error was detected in the first packet. When the test signal is detected, it is scheduled to be sent on the next I-frame. Given the amount of encoding delay or latency inside the video encoder, the downstream TS extractor will receive the trigger packets several frames before the arrival of the test signal. Using timecode to detect the target I-frame makes injector/extractor interaction insensitive to frame buffering or latency within the system.

Figure 9B:
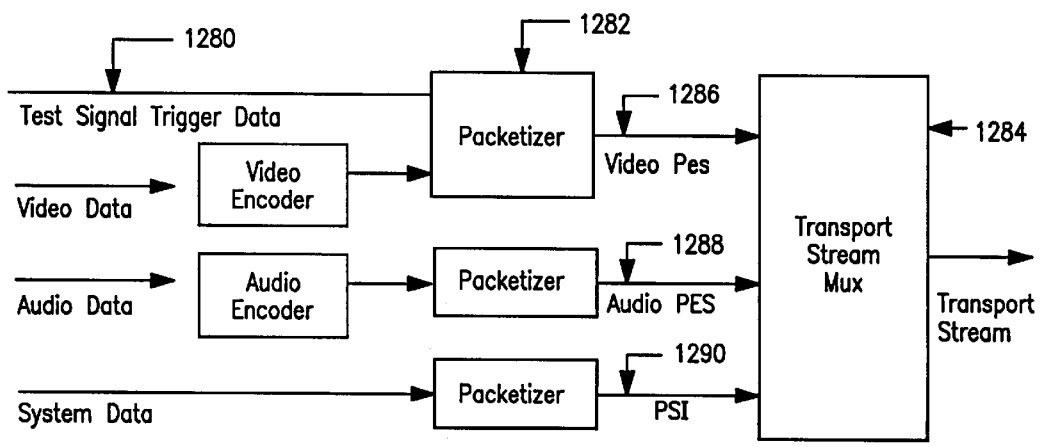
FIG. 9B illustrates an MPEG 2 multiplexer multiplexing the data structure of FIG. 9A

In FIG. 9B, the test signal trigger data 1280 is packetized as a video Program Elementary Stream (PES) private data embedded into video Private Elementary Stream. The test signal is then multiplexed into the NPEG transport stream in transport stream multiplexer 1284 along with the audio and program system information. Embedding the trigger packet into the video PES tightly couples the test signal trigger packet with the video. There may be several video PES streams being multiplexed together, each one carrying its own test signal and trigger packets.

Figure 10:
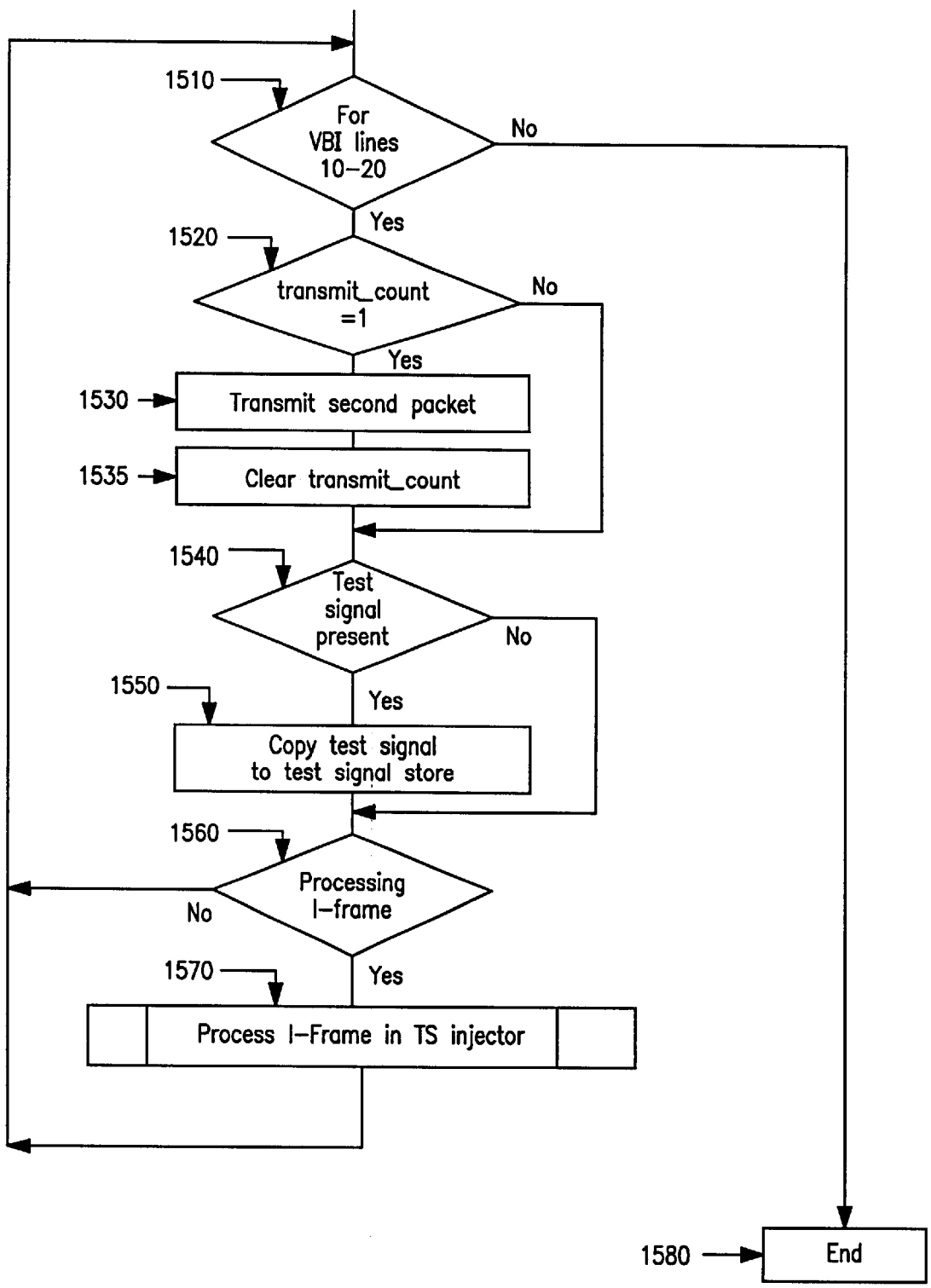
FIG. 10 is a flow diagram for processing of each frame in an MPEG-2 encoder.

FIG. 10 describes the logic flow of the test signal injection controller shown in FIG. 8.

On each frame a loop is entered 1510–1570 to see if there are any trigger packets to transmit 1520. If so, the packet is sent 1530 and the transmit count is zeroed 1535.

Each VBI line is tested in both fields for the presence of a non-black signal 1540. If found, the test signal is copied into test signal store 1550. If the current frame is an I-frame 1560, additional I-frame logic is invoked 1570. Processing ends 1580 after the last VBI line has been processed.

Figure 11:
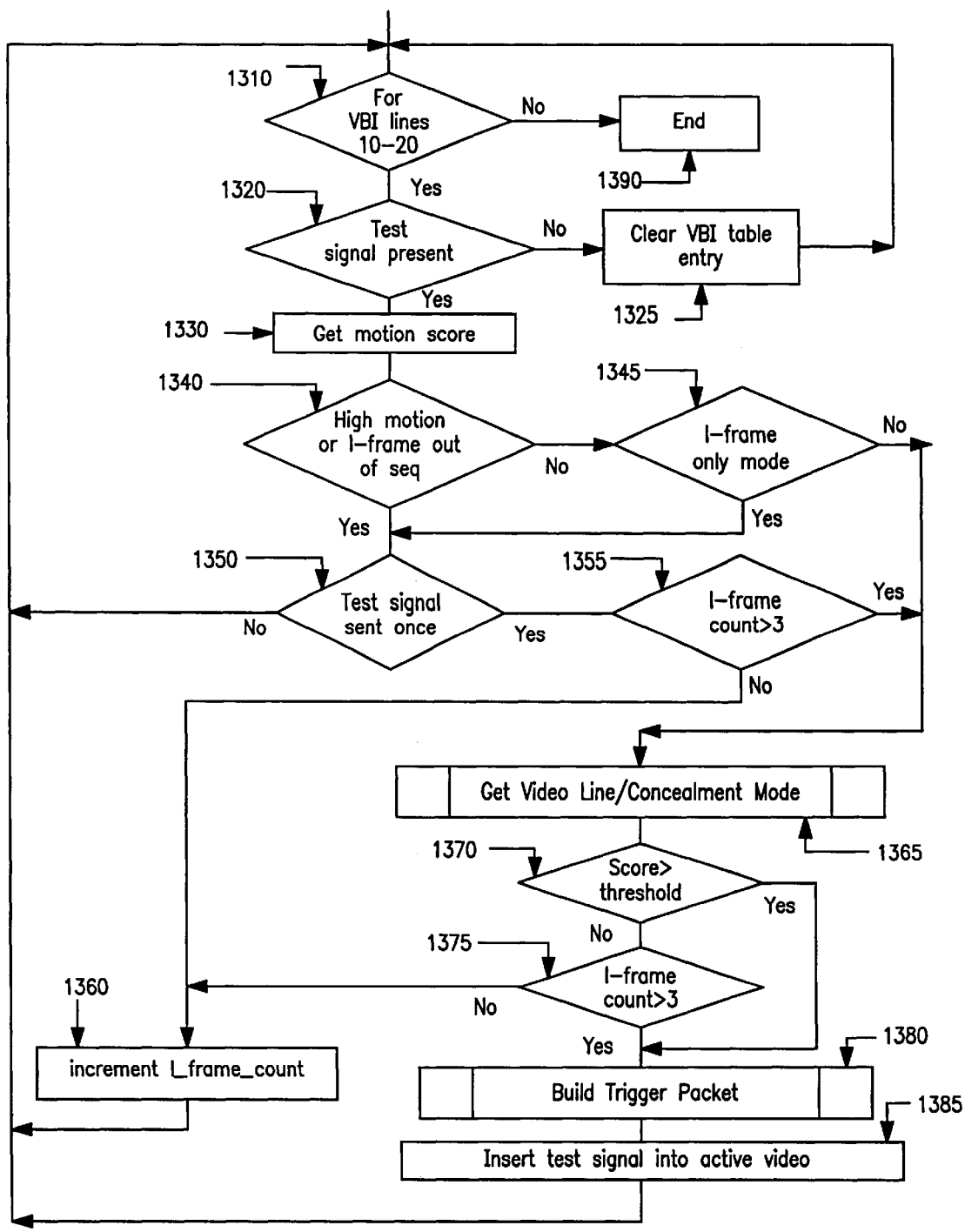
FIG. 11 is a flow diagram for processing I-frames in a test signal injector of FIG. 8.

FIG. 11 depicts injector I-frame processing invoked in operation 1570 shown in FIG. 10. Each line on the test signal portion of the VBI 1310 is again examined for the presence of a test signal 1320. If not found, the VBI table entry for that line is cleared 1325. Otherwise, the motion score is retrieved 1330 and a test is performed to determine if there is currently high motion or if this is an out of sequence I-frame 1340. During a rapid scene change, the MPEG-2 video encoder may encode an I-frame even though an I-frame was not the expected frame type in the GOP sequence. If either of these conditions test true, the test is made to see if the test signal has been sent at least once to the TS extractor 1350. If not, the I-frame may be safely skipped. Otherwise, the I-frame count is checked to ensure I-frames haven't been suppressed for more than 3 frames 1355. If not, the I-frame count is incremented 1360 and the loop iterates. Otherwise, the test signal is necessarily injected into the video. Another test is performed in operation 1345 to determine if the video encoder is configured for I-frame only mode. If so, the test signal is again suppressed. The test signal is transmitted on every fourth frame when operating in I-frame only mode. I-frame only encoding is rarely used when transmitting video due to the very high bandwidth consumption. The highest ranked line in concealment mode are retrieved 1365 and the score is compared against the user specified quality threshold 1370. If the score is higher, the test signal is sent. Otherwise, the I-frame count is checked again 1375 and the test signal is sent only if the count is greater than 3. The trigger packet is built and transmitted in 1380. The test signal is inserted in video input sent to the MPEG-2 video encoder in 1385.

Figure 12:
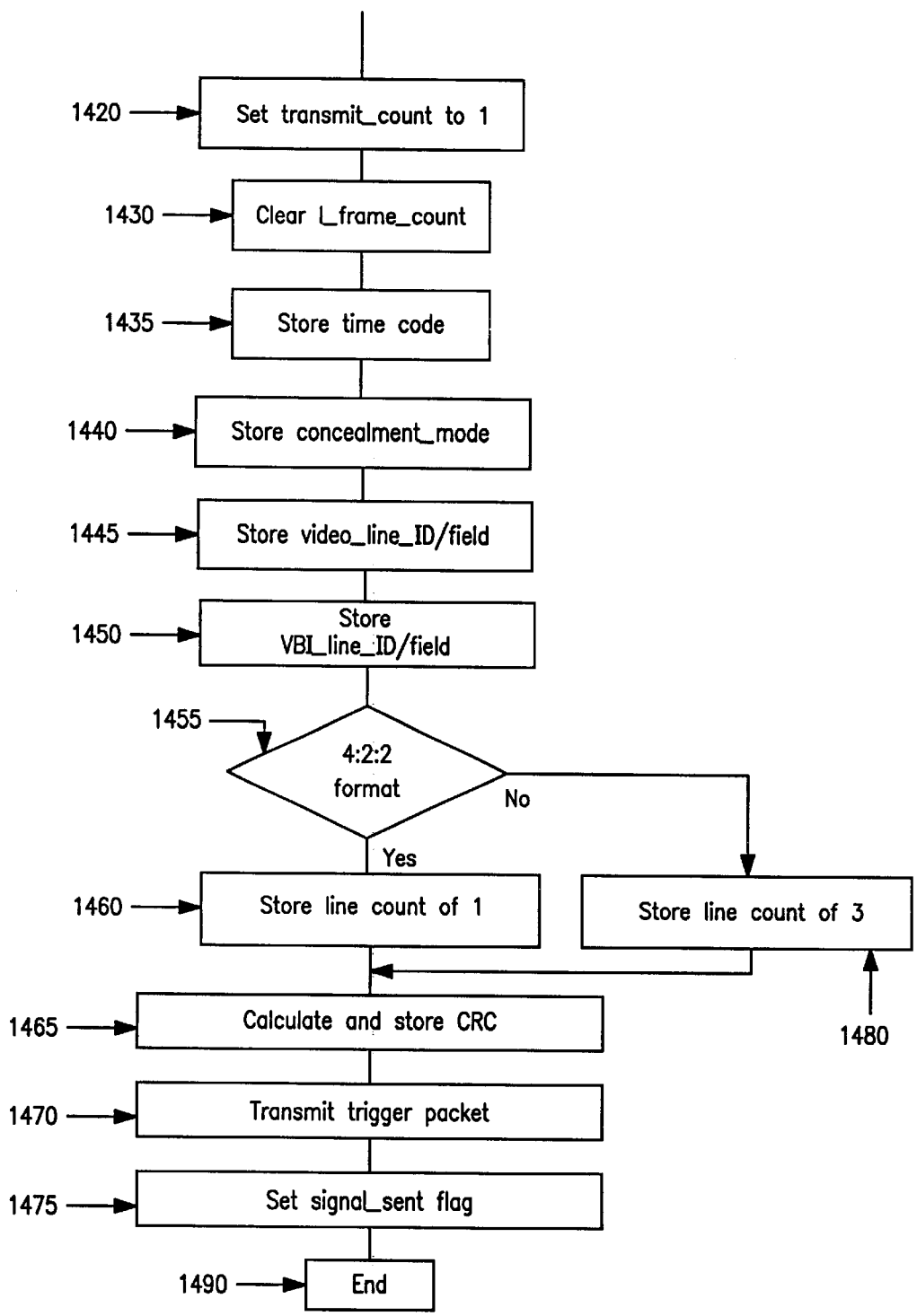
FIG. 12 is a flow diagram for building a Trigger Packet.

In FIG. 12, a Trigger Packet is built by the injector shown in FIG. 8. The Trigger Packet includes all information needed by the TS extractor to remove the test signal from the active video area and place the signal into the correct VBI line. The trigger packet is built in the following sequence of steps. The transmit count is set to 1 in block 1420. The I-frame is cleared in block 1430. The timecode is stored in block 1435. The concealment mode is stored in block 1440. The video line ID field is stored in block 1445. The VBI line ID field is stored in block 1450. A test is performed to determine the presence of the 4:2:2 format. A "yes" condition stores the line count of 1 in block 1460. A "no" condition stores the line count of 3 for a 4:2:0 format in which three consecutive video lines are used to transmit the signal instead of 1 as in the 4:2:2 format. The "no" condition stores the line count of 3 in block 1480 and both blocks 1460 and 1480 advance to block 1465 to calculate and store a CRC for the trigger packet. The trigger packet is transmitted in block 1470 and a signal sent flag is set in block 1475 indicating that the downstream TS extractor now has an active test signal in the VBI after which the process ends in block 1490.

Figure 13:
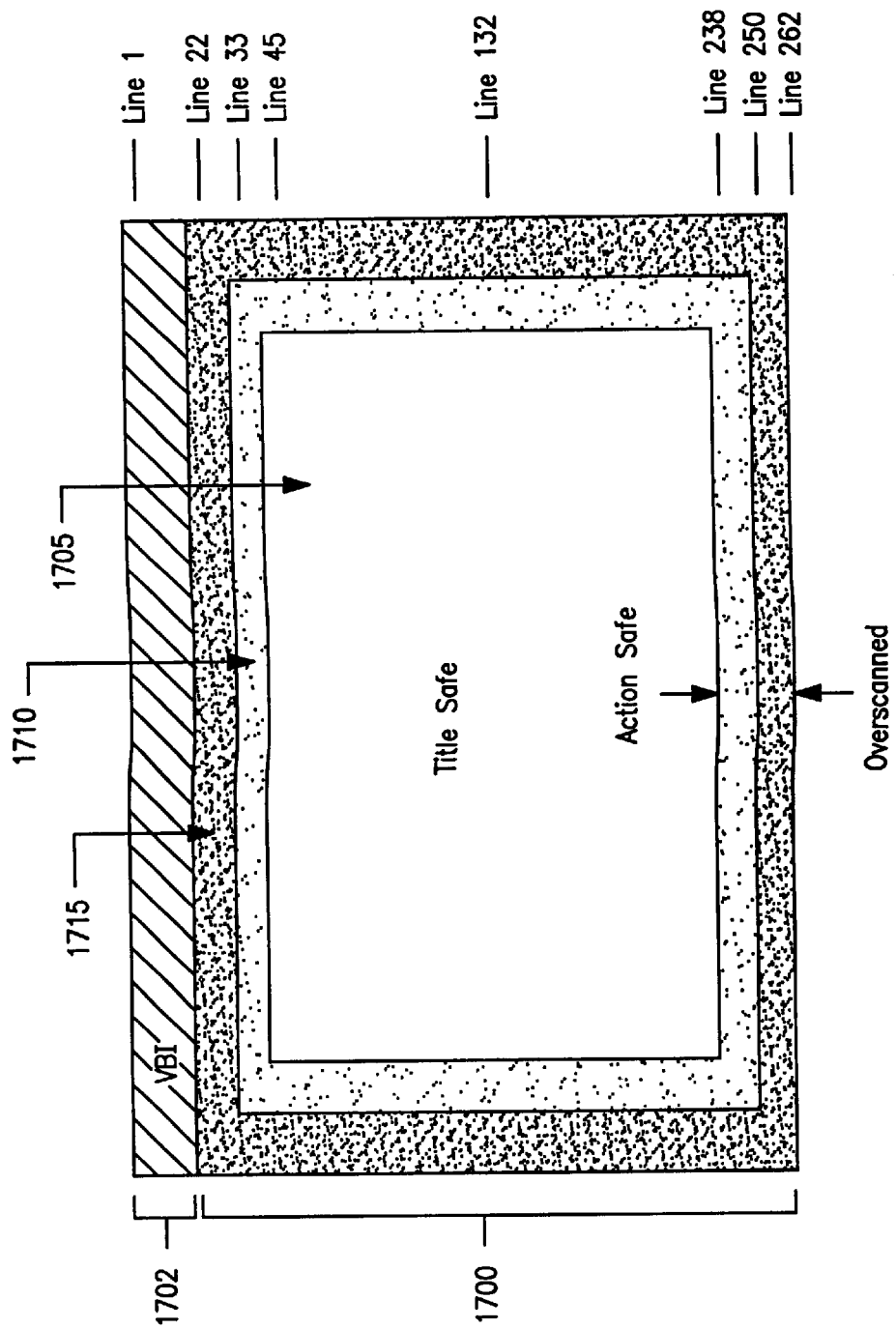
FIG. 13 discloses a television screen showing the areas of test signal insertion.

FIG. 13 discloses a television screen including an active video area 1700 of an NTSC broadcast of 525 video lines comprising two interlaced fields of 2625 lines each (not shown). The active video further comprises a title safe area 1705 and an action safe area 1710. These areas serve as boundaries that guide producers in the framing of a scene or placement of title text. Lines 22 through 33 and lines 250 through 262 of each interlaced field lay in an overscanned area 1715. The size of the overscan will vary for each television and even within the same television due to fluctuations in the voltage regulation of a power supply. To prevent viewers from seeing the non-picture area of the horizontal and vertical scans, the overscan is typically set for 5% of the active video which, effectively renders unviewable approximately 12 lines of each field at the top of the screen. The overscanned area offers a high degree of confidence that the concealment of test signals will not be noticed by viewers regardless of video content. It should be noted however that the number of test signals that may be passed in the overscanned area is limited in 4:2:0 mode because each test signal requires 3 lines of active video for transmission. To optimize repair of three contiguous video lines, the adjacent lines must not be used which allows only 4 test signals to be passed in the upper or lower overscan area. A Video Blanking Interval (VBI) 1702 is made up of video lines 1 through 21 and completes the frame of a video signal.

When the overscanned area is fully utilized, the video lines are ranked or scored by the effectiveness of the concealment. The placement of the test signal within the active video area is then determined by comparing the highest concealment score against a predetermined threshold. The lower the threshold, the less effective the concealment. When scores fall below an acceptable threshold, 1-3 I-frames may be skipped where no test signals are injected.

Although the preferred embodiment teaches placement of the test signal outside the viewing area, concealment techniques used in the present invention make possible other embodiments that pass signals or other data in the title safe area 1710 because the current video content in this area facilitates optimum concealment. Concealment is enhanced because the TS injector instructs the TS extractor how to best repair the missing video line. The usurped video line is replaced using spatio-temporarily adjacent video lines in one of several modes using:

1. The same line from the prior frame, opposite field;
2. The same line from the next frame, opposite field;
3. The adjacent line (upper) in the current frame;
4. The adjacent line (lower) in the current frame; and
5. A composite line built from two of the four (4) above-mentioned lines.

These repair techniques, when combined with optimum placement of the test signal within the video area by the TS injector, result in a high degree of concealment.

Figure 14:
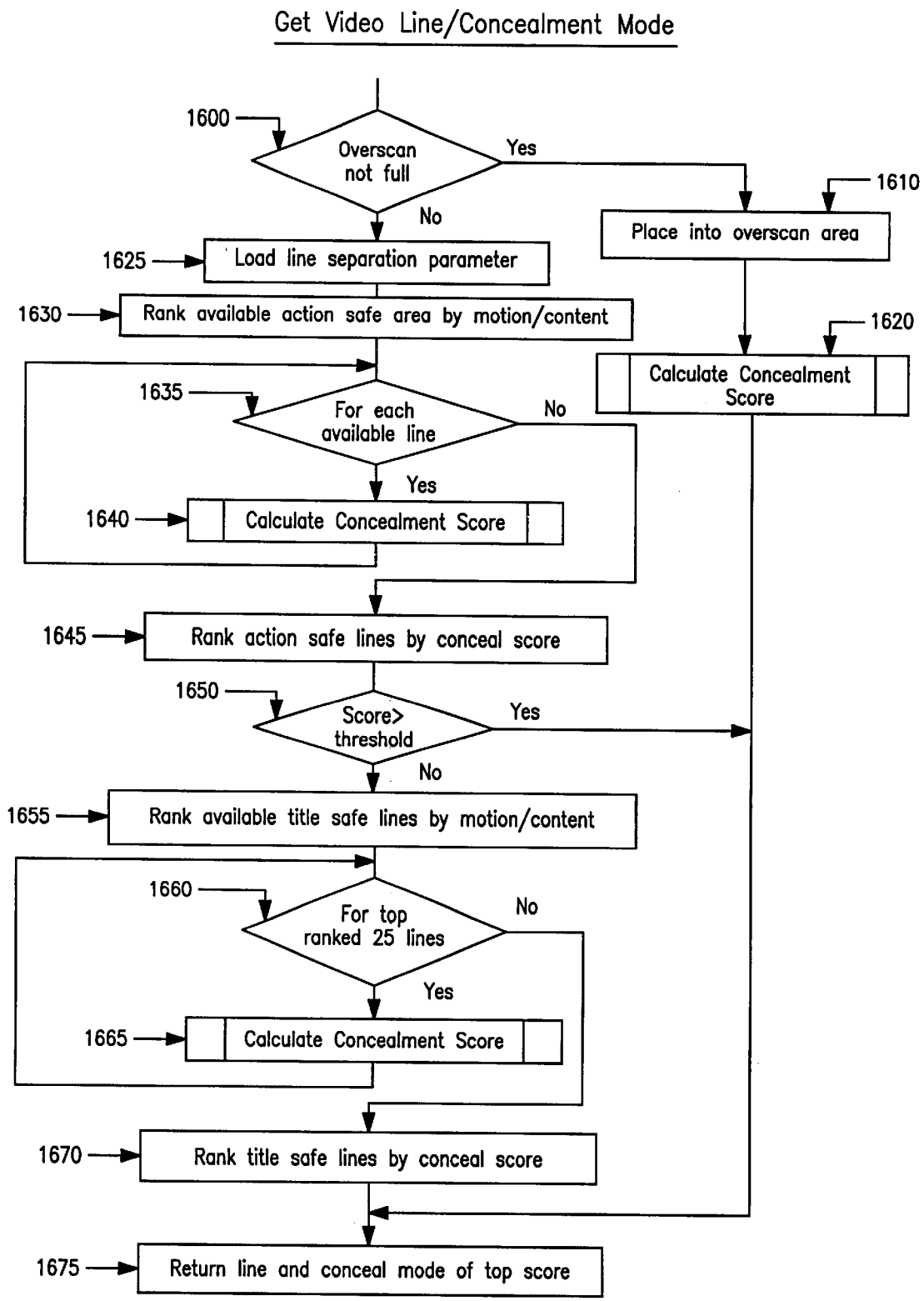
FIG. 14 is a flow diagram for video line concealment in the text injector of FIG. 8.

FIG. 14 describes a concealment process. The test signal 1600 is applied to test block 1602 to determine whether there is available space for the signal. A "yes" condition places the signal into an overscanned area in block 1610 and a concealment score is calculated in block 1620, after which processing ends in block 1690. A "no" condition indicates the overscanned area is full and the line separation distance is loaded in block 1625, after which all available safe action lines (33–45 and 238–250) (See FIG. 14) are ranked by motion and content in block 1630. In test block 1635, each available line receives a concealment score in block 1640 until all lines have a concealment score, after which test block 1635 is exited in a "no" condition to rank action safe lines by concealment score in block 1645. In test block 1650, the concealment score for each line is compared against the threshold. If the top score is greater than the predetermined threshold, a "yes" condition returns the line, mode and score to block 1690 to end the process. Otherwise, a "no" condition ranks the available title safe lines 46–237 according to motion/content score in block 1655. Scoring is weighted towards lines devoid of content (black, continuous color or pattern) and lines with static motion for three frames. In test block 1660, the top ranked 25 lines are each calculated for a concealment score in block 1665. When all concealment scores have been calculated, a "no" condition returns the lines to block 1670 in which the title safe lines are ranked by concealment score and the top candidate is returned to block 1690.

Figure 15:
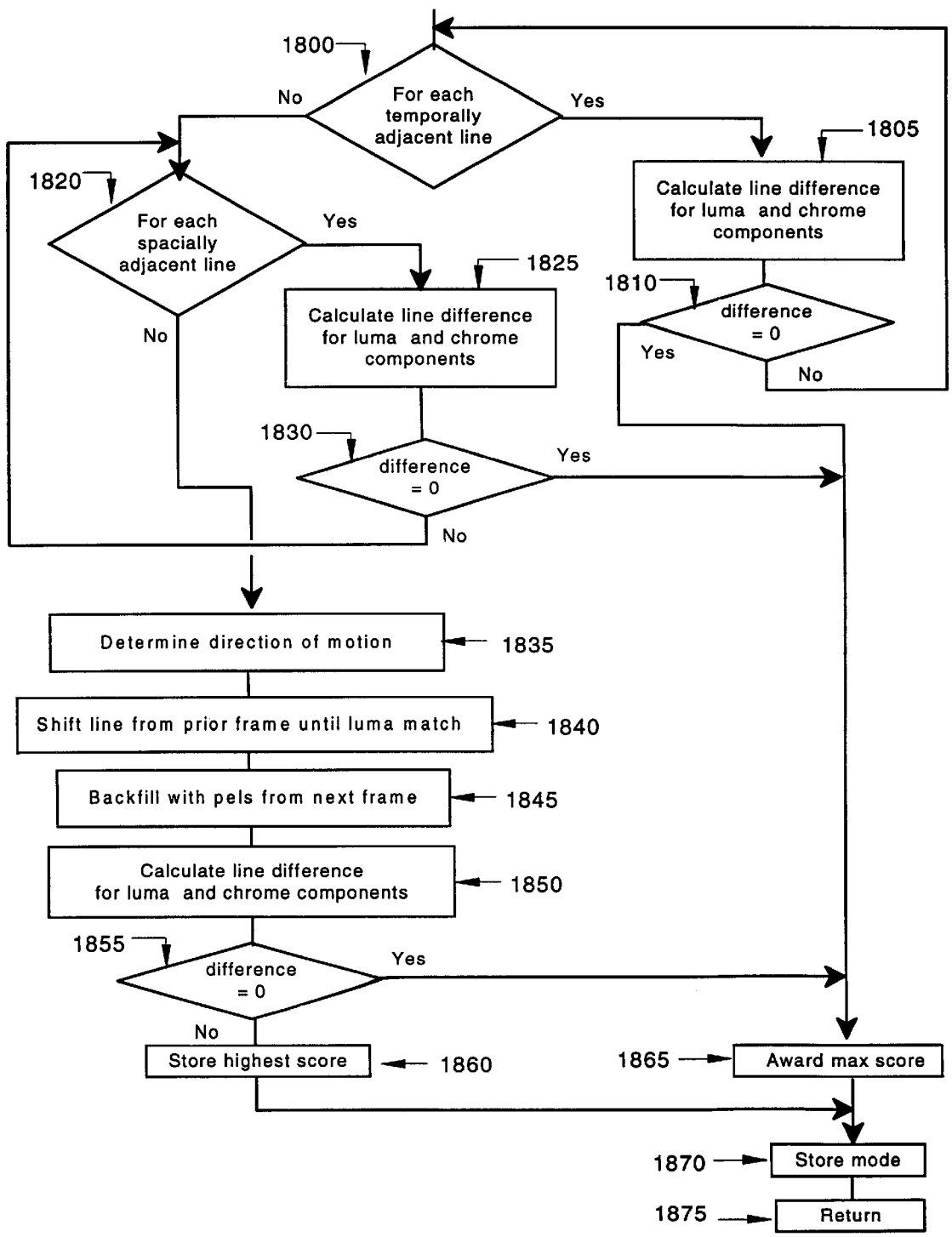
FIG. 15 is a flow diagram for calculating concealment scores for the injector of FIG. 8.

FIG. 15 describes the process for calculating line concealment scores. The line differences are calculated between the target video line and the same line in the prior and next frames in block 1800. A "yes" condition initiates a calculation to determine the line difference for luma and chroma components in block 1805. In test block 1810 the temporary adjacent lines are tested for a difference of zero indicating a perfect match. A "yes" condition awards the line a maximum score in block 1865 and the mode is recorded in block 1870, after which the process returns to test block 1800.

A "no" condition from test block 1810 returns the process to block 1800 from which a "no" condition returns each temporarily adjacent line to test block 1820. For each spatially adjacent line a "yes" condition initiates block 1825 which computes the difference between target video lines and the two spatially adjacent lines in the other field of the current frame. A test block 1830 compares the difference between the target video line and the two spatially adjacent lines to zero. A "yes" condition indicates a match has occurred and the maximum score is given in block 1865 which is stored in blocks 1870, after which the process returns to block 1800.

Figure 16:
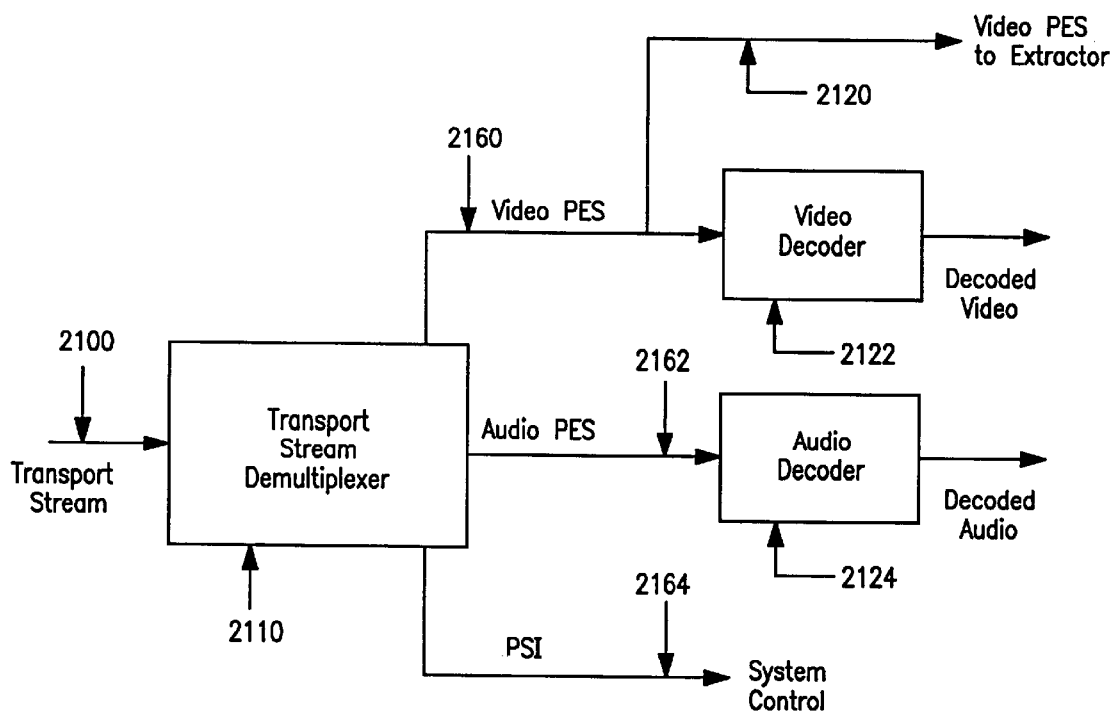
FIG. 16 illustrates an MPEG 2 demultiplexer.

A "no" condition from block 1830 indicating no match, indicating temporarily adjacent lines do not have a difference of zero, the process returns to block 1820 to determine an alternative concealment score. The "no" condition for block 1820 refers the spatially adjacent lines to block 1835 which determines the direction of motion using motion vectors computed by the video encoder and the same line from the prior frame is shifted in that direction in block 1840 until the luma difference is minimal in block 1840. Next, pixels are taken from the same video line of the next field in block 1845 to fill in the pixels that were shifted out in a luma/chroma difference is calculated in block 1850. Test block 1855 compares the difference against zero and a "yes" condition returns the output to block 1865 which awards a maximum score followed by storing the mode in block 1870 and returning to block 1800 from block 1875. Where the difference is not zero in test block 1855, the highest score of the previous five calculations are stored in block 1860 and the mode is saved in block 1870 followed by return to block 1800. Test Signal Extractor Operation:

FIG. 16 describes a transport data stream flow in the MPEG 2 demultiplexer. The transport stream 2100 from the ATM switch 140 (See FIG. 1) is received by demultiplexer 2110 which parses the stream into a video PES 2160; an audio PES 2162; and a system control 2164. The video PES 2160 is forwarded to the test signal extractor to demultiplex the test trigger signal. The video PES is also provided to video decoder 2122 which provides a decoded video. The audio PES 2162 is provided to an audio decoder 2124 which provides a decoded audio output.

Figure 17:
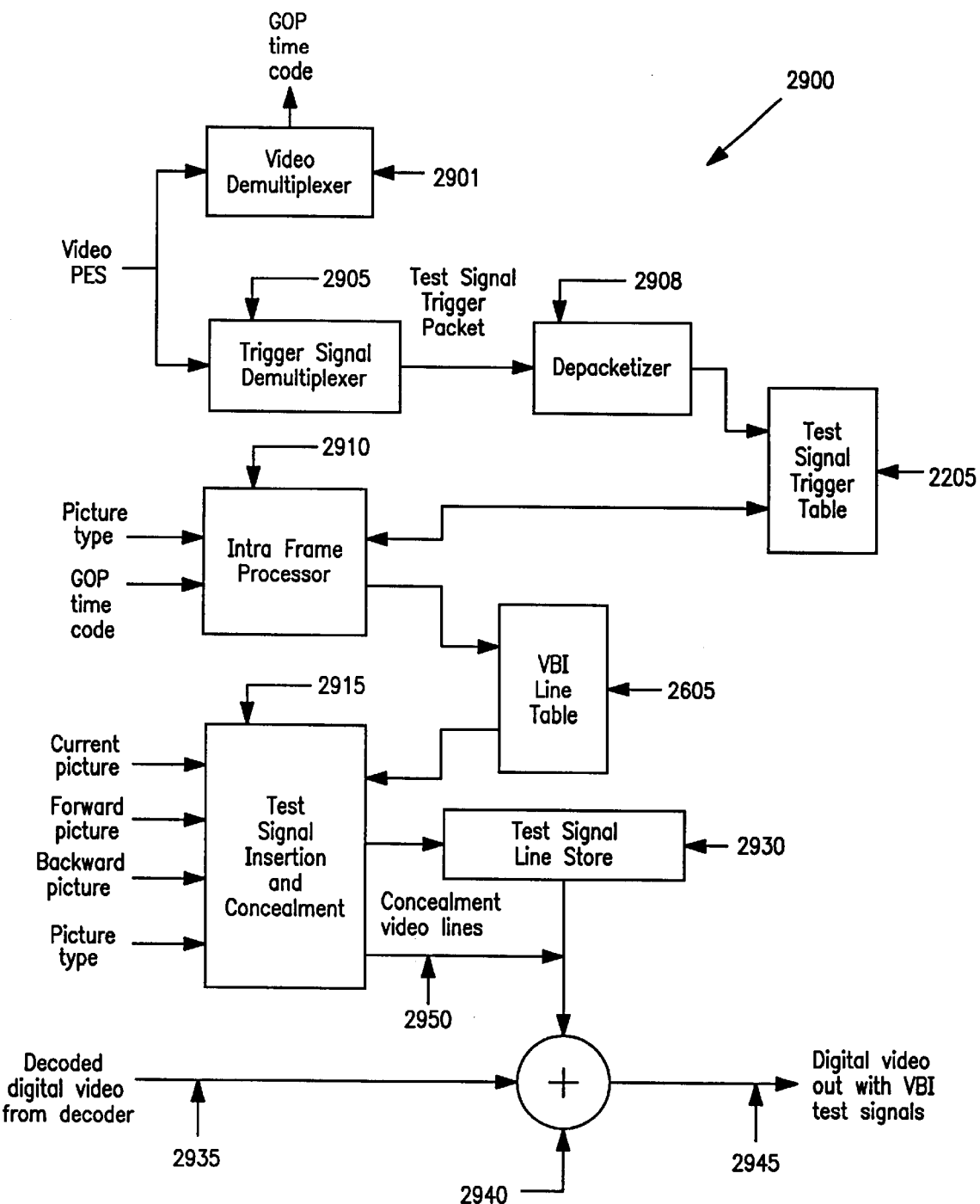
FIG. 17 is a block diagram of the test signal extractor.

FIG. 17 is a block diagram of a test signal extractor 2900. The extractor contains a video demultiplexer 2901 which demultiplexes the video PES stream and extracts the SMPTE timecode embedded in the GOP header used to identify I-frames. A trigger signal demultiplexer 2905 and a depacketizer 2908 extract the test signal triggers and stores them in the test signal trigger table 2205. Synchronously with the decode of each frame, an inter-frame processor 2910 receives a picture type and GOP timecode and compares the timecode of the decoded I-frame with the trigger table entries in table 2205. Entries are made in the video blanking line table 2605 for every matched I-frame and trigger packet. The test signal insertion and concealment device 2915 which may be software or hardware, receives the current picture indicator; the forward picture indicator; the backward picture indicator; and picture type, then synchronously with the presentation of I-, B-, and P-frame, generates a test signal from a test signal line store 2930 which is inserted into the video blanking interval 2940 for each active VBI line entry in block 2605. Additionally, the test signal in the active video area of the I-frame is concealed (using the process of FIG. 14) by insertion of a video line retrieve/built from picture store according to the concealment mode contained in the trigger packet. The repaired video 2945 is forwarded for digital-to-analog conversion and subsequent display in the TV screen.

Figure 18:
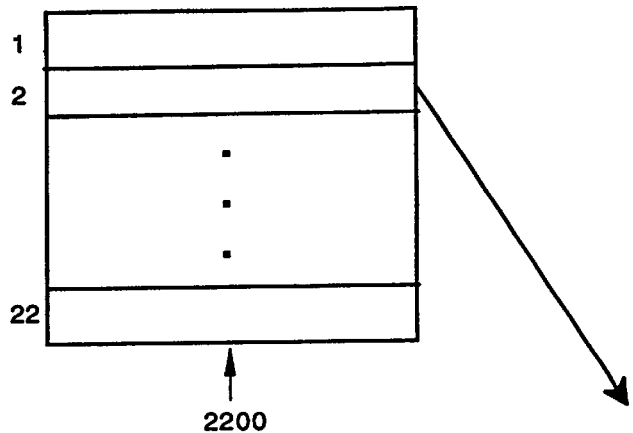
FIG. 18 is a representation of an extractor test signal trigger table for the extractor of FIG. 17.

FIG. 18 describes the test signal trigger data structure 2200 for lines 1 through 22 of the video blanking interval. Each test signal data structure is stored in a table 2205 comprising Column 1, the test signal component; Column No. 2, the number of bits in a component; and Column No. 3, a mnemonic for the component. The components of the signal trigger data structure include a timecode in block 2210; a marker in block 2215; a video blanking interval line ID/field in block 2220; a video line and ID/field in block 2230; a marker in block 2235; a line count in block 2240; a concealment mode in block 2250; and stuffing or padding digits in block 2260; and a cycling redundancy code in block 2270.

Figure 19:
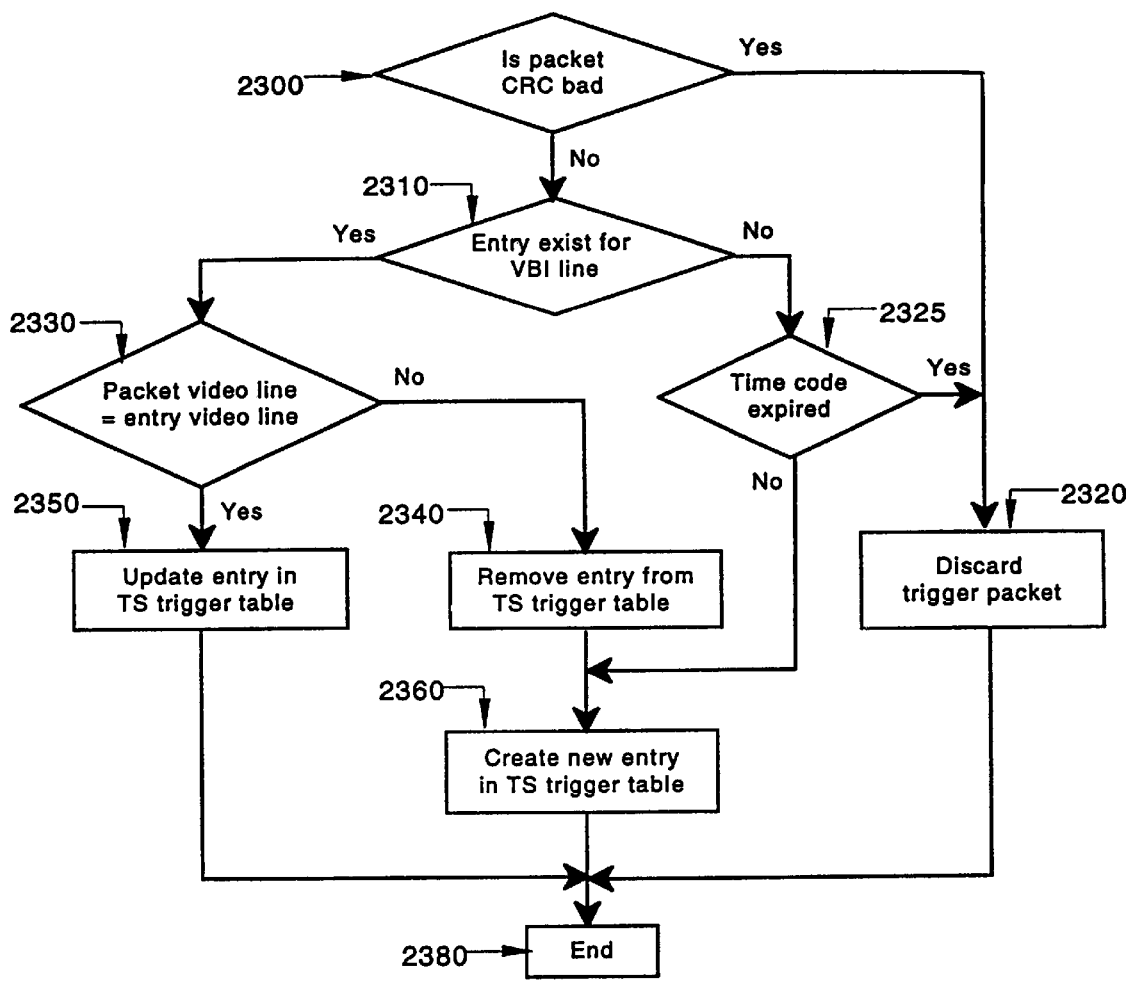
FIG. 19 is a flow diagram of processing a trigger packet in the extractor of FIG. 16.

FIG. 19 describes processing the trigger packet received at the extractor. In block 2300 the packet is checked for a bad CRC. A "yes" condition discards the trigger packet in block 2320. A "no" condition transfers the packet to test block 2310 to determine whether an entry already exists for the VBI line ID contained in the packet. A "no" condition initiates test block 2325 to determine if the timecode has expired for the packet. A "yes" condition returns the packet to block 2320 which discards the packet. A "no" condition returns the packet to block 2360 which creates a new entry in the test signal trigger table 2200 after which the process ends. If an entry does exist for a video blanking interval line test block 2310, a "yes" condition transfers the packet to block 2330. The video line ID field of the entry and the trigger packet are compared in test block 2330. If the packet video line equals the entry video line, a "yes" condition forwards the packet to block 2350 which updates the entry for the packet in the trigger table. If the packet video line and the entry video line are not equal, the packet is returned to block 2340 which removes the entry from the test signal trigger table and creates a new entry in the test signal trigger table in block 2360 after which the process ends. A feature of the present invention is to dynamically move the test signal within the active video area. Operations 2340 and 2360 allow the test signal to be relocated on an I-frame making the TS extractor responsive to the injector on a I-frame basis.

Figure 20:
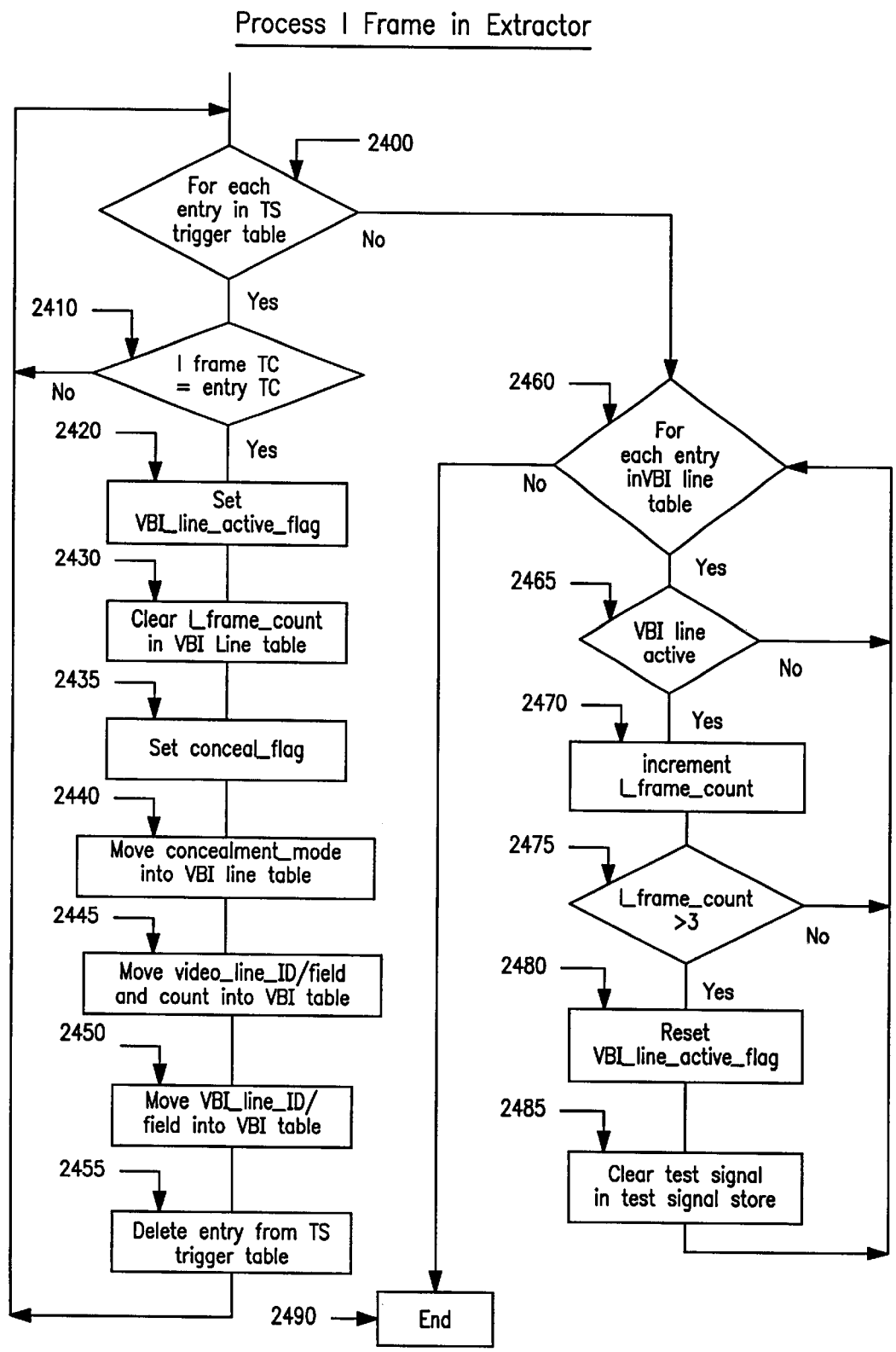
FIG. 20 is a flow diagram for processing I-frames in the extractor of FIG. 17.

FIG. 20 describes the processing of an I-frame in the test signal extractor. Upon arrival of each I-frame, a test block 2400 determines whether or not an entry exists in the timing signal trigger table. A "yes" condition initiates a test 2410 to determine if the frame timecode equals the table entry timecode. A "no" condition returns the process to block 2400. A "yes" condition initiates block 2420 the VBI line active flag is set after which the I-frame count is cleared in the VBI line table in block 2430. The conceal flag is set in block 2435 and the new concealment mode is moved into the video blanking interval line table in block 2440. The video line ID field and count are also moved into the video blanking interval table in block 2445 after which the video blanking line ID and field are moved into the video blanking interval table in block 2450 and the I-frame is deleted from the timing signal trigger table in block 2455 and the process returns to block 2400. If an entry does not exist in the timing signal trigger table, a "no" condition transfers the frame to the video blocking interval line table shown in FIG. 22 which will now be described after such description the process will return to FIG. 20.

Figure 21:
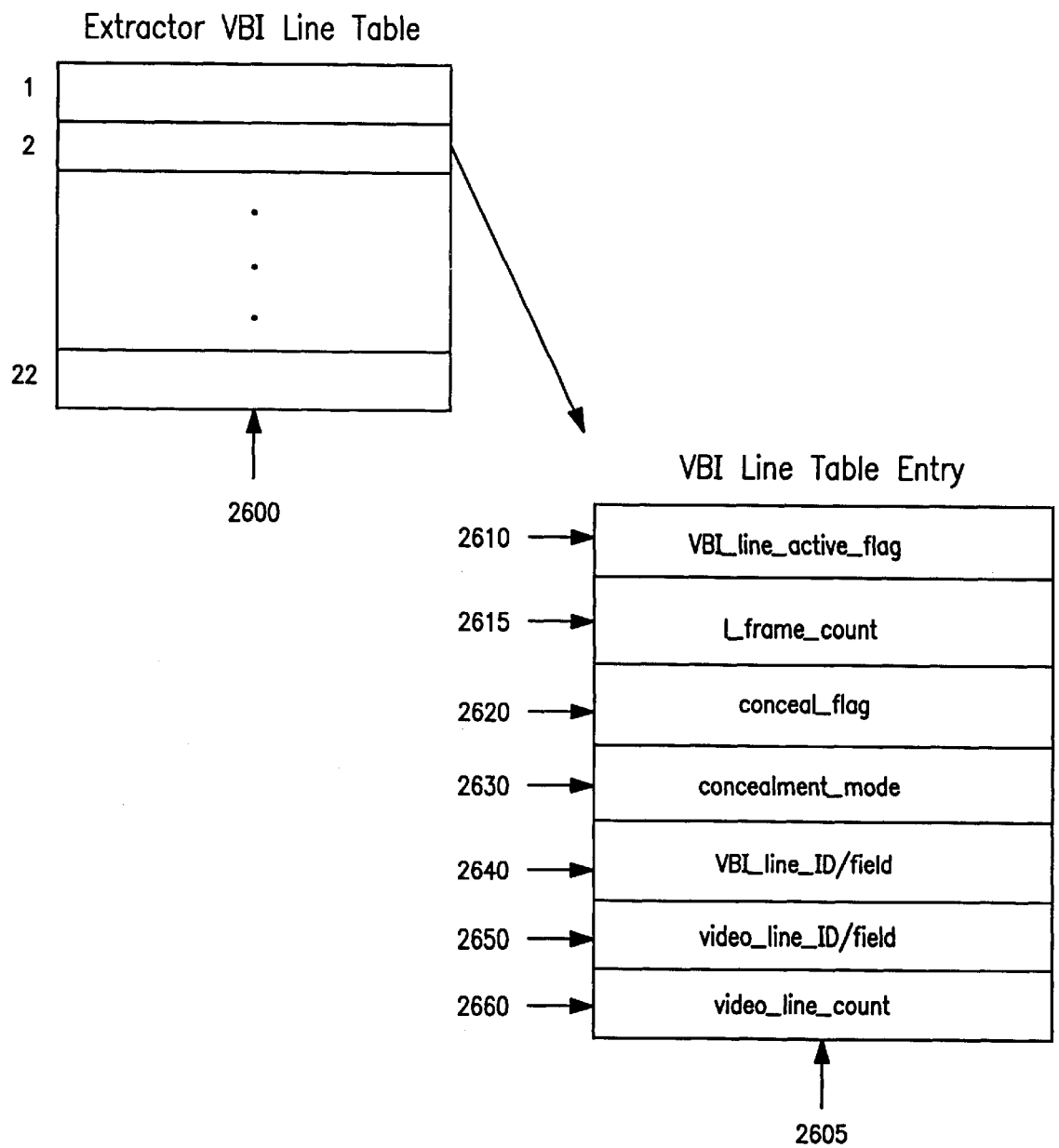
FIG. 21 is representation of a VBI line table for the extractor of FIG. 17.

In FIG. 21, 22 entries exist in the video blanking interval line table 2600, one for each video blanking line from line 10 to line 20 exclusive in each field. Each entry in the table 2600 is shown in block 2605. The video blocking interval line active flag is installed in block 2610 which signals the TS extractor to move the test signal from the video store onto the video blanking interval line. An I-frame count block 2615 is used to timeout the test signal should it appear from the test signal injector input. Test system injector does not generate a separate trigger to signal the removal of its test signal from the video blanking interval. After three consecutive I-frames are received without an embedded test signal, the test signal extractor removes the entry from the video blanking interval line table and ceases to generate the test signal. A timeout of 3 I-frames in a video network using a GOP count of 12. A concealment flag is stored in block 2620 and the concealment mode in block 2630. The concealment flag and concealment mode are used at I-frame reconstruction to repair the video line used to carry the test signal. The video blanking interval line and ID field is stored in block 2640. A video line ID field is stored in block 2650 and a video line count is stored in block 2660. The video line ID field identifies the video line to repair and the video line count indicates the number of lines which were used to transmit the test signal.

Returning to FIG. 20, test signals in the video area, the I frame process 2400 loops through each entry in the extractor test signal trigger table. Upon exit of the loop, each entry in the VBI line table is examined in block 2460 to determine if the VBI line is marked "active". A "no" condition ends the process. A "yes" condition initiates test block 2465 to determine if the VBI line is marked active. A "no" condition returns the process to block 2460. A "yes" condition increments the I-frame count 2615 in table entry 2605, and the process transfers to test block 2475 in which the I-frame count is examined to determine if three (3) I-frames are exceeded. A "yes" condition initiates test block 2480 which resets the VBI line "active" flag in table 2605. The VBI entry is marked "inactive" in test block 2480 and the test signal is cleared from the video store in block 2485. After all VBI lines have been examined in the loop comprising operations 2460 through 2485, the process ends in block 2490.

Figure 22:
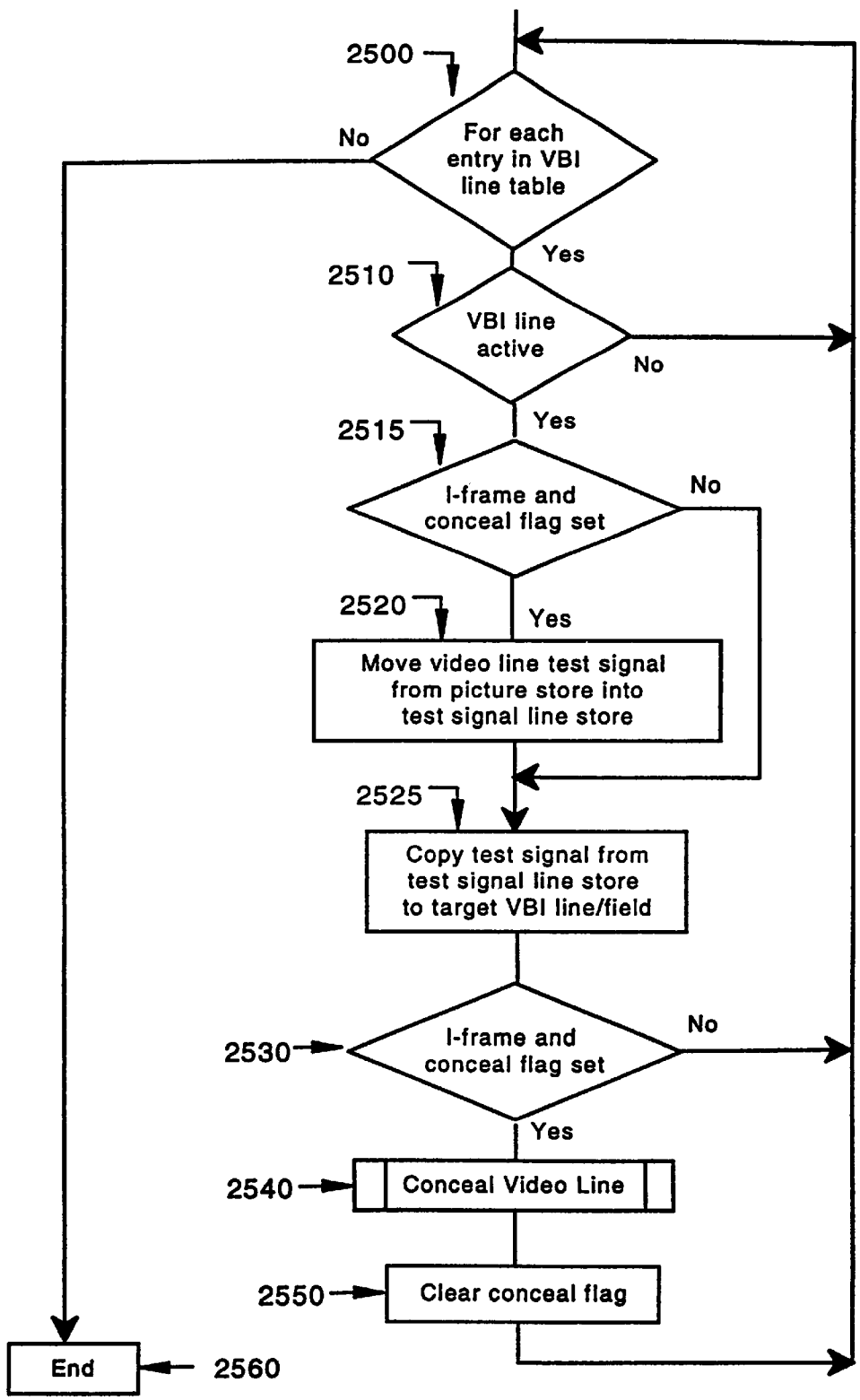
FIG. 22 is a flow diagram for frame reconstruction in the test signal extractor of FIG. 17.

Now turning to FIG. 22, frame reconstruction will be described. During frame reconstruction the TS extractor loops through each "active" VBI line entry in test block 2500. A "no" condition ends the process. A "yes" condition initiates test block 2510 to determine whether the VBI line is active. A "no" condition returns the process to test block 2500. A "yes" condition determines if the I-frame and the conceal flag are set in test block 2515. If the conceal flag is set, the frame currently being processed is an I-frame that carried a test signal so the test signal is moved out of the current picture into test signal line in block 2520. The test signal is then copied from the signal line stored into the target VBI line field of the current picture in block 2525. A test block 2530 determines if the I-frame and the conceal flag are set. A "no" condition returns the process to test block 2500. A "yes" condition conceals the video line in block 2540. The process of concealing the video line will next be described in conjunction with FIG. 24. After the video line is concealed, a conceal flag is cleared in block 2550, after which the process returns to block 2500.

Figure 23:
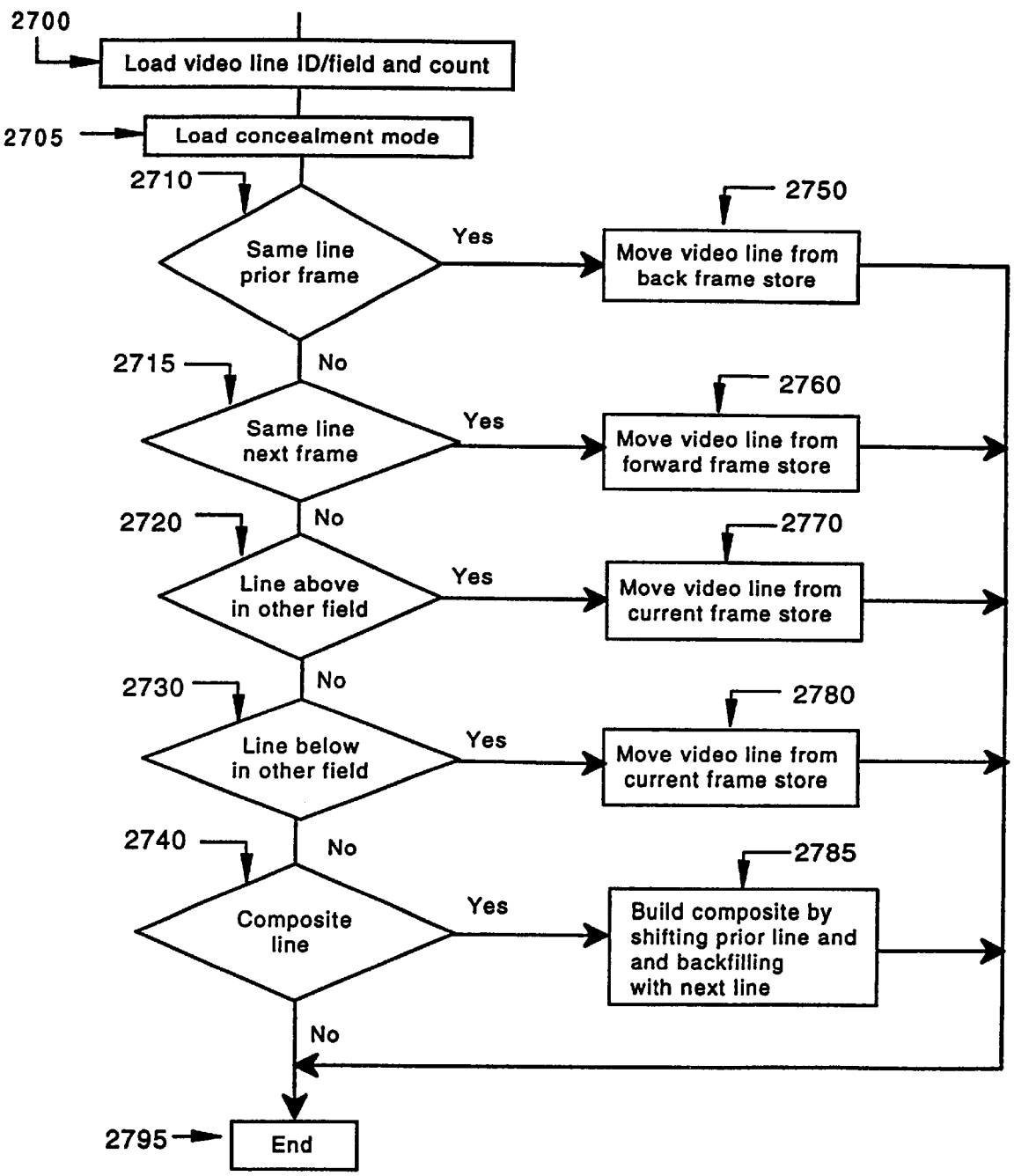
FIG. 23 is a flow diagram for concealing video lines in the extractor of FIG. 17.

Turning to FIG. 23, the process of concealing a video line implements the concealment mode stored in line 2630 of the VBI line table 2605 in the VBI table 2600 of FIG. 21. The video line ID field and count in the VBI entry table are loaded into the process in block 2700. The concealment mode is loaded in block 2705 after which the test block 2710 determines whether the concealment mode is the same line or a prior frame. A "yes" condition moves the video line from the back frame store in block 2750 after which the process ends. A "no" condition from test block 2710 initiates test block 2715 to determine if the same line is in the next frame. A "yes" condition initiates block 2760 which moves the video line from the forward frame store after which the process ends. A "no" condition for the test block 2715 determines whether the concealment mode is in the same line of the next frame. A "yes" condition initiates block 2760 which moves the video line from the forward frame store after which the process ends. A "no" condition initiates test block 2720 in which determination is made as to whether or not it is a line above in the other field. A "yes" condition moves the video line from the current frame store 2770, after which the process ends. A "no" condition initiates test block 2730 to determine if the concealment is going to be in the line below in the other field. A "yes" condition initiates block 2780 which moves the video line from the current frame store, after which the process ends. A "no" condition initiates test block 2740 to build a composite line. A "yes" condition builds the composite line in block 2785. The composite line is built by shifting carrier lines and back filling with the next line, after which the process ends. A "no" condition ends the process.

Summarizing the operations 2750 and 2760 repair the line using the same lines/field from the previous frame and next frame, respectively. Block 2770 and 2780 use the next line above and below the line needing repair. These lines are taken from the other field of the current frame. Blocks 2730 and 2740 involve averaging the lines separated either temporarily or spatially. In block 2785 the line is concealed by building a composite line by using part (indicated by pixel shift count) of the lines from the previous frames, then using pixels from the next frame to fill in the shifted out pixels.

Figure 24:
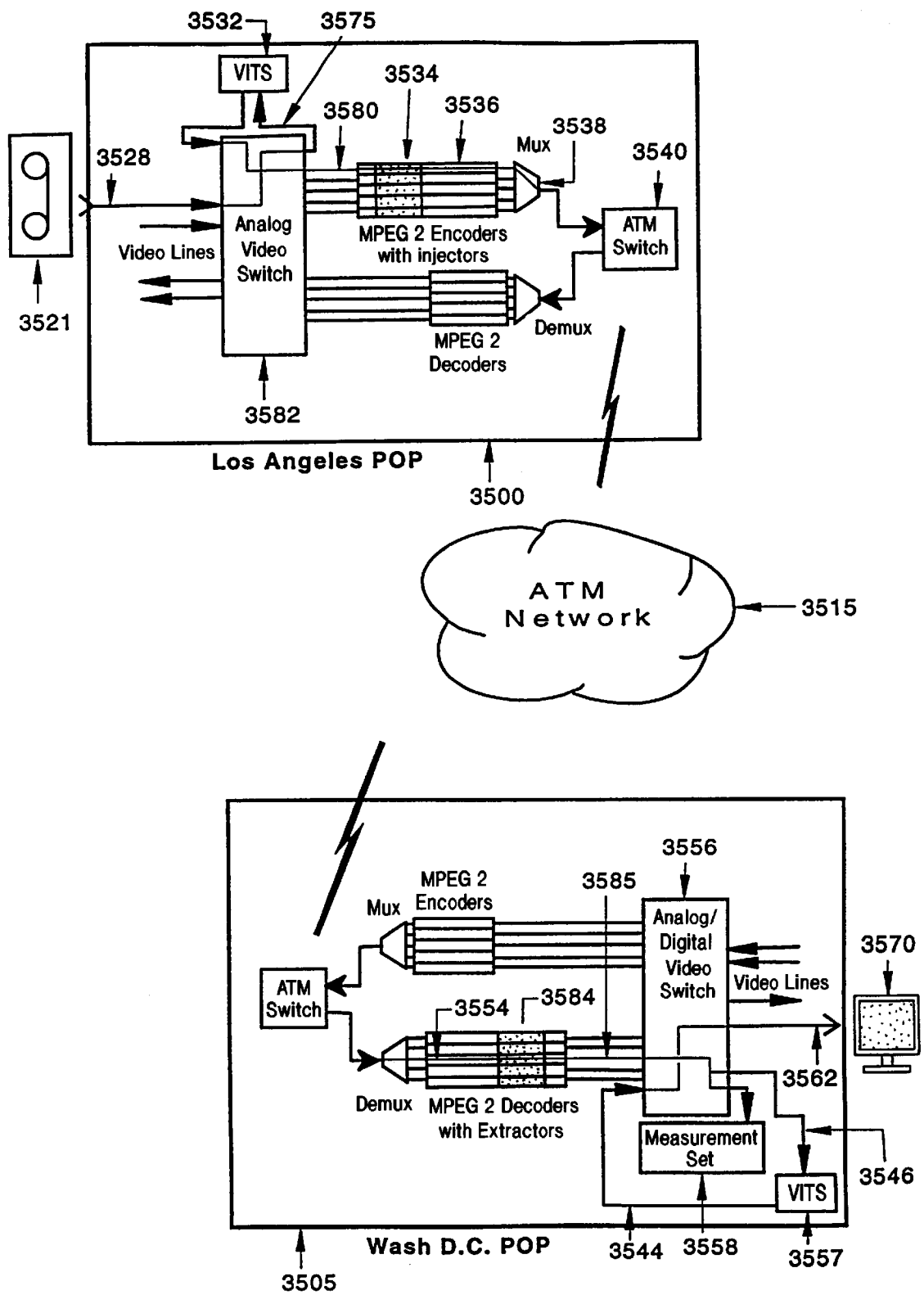
FIG. 24 is an alternative embodiment of the invention of FIG. 1.

FIG. 24 describes an alternate embodiment of the invention. In FIG. 24, in-service testing is accomplished using video test signals inserted into the VBI. At the origin POP 3500, the subscriber's video feed 3528 is routed through the analog video switch 3582 into the Vertical Interval Test Signal (VITS) equipment 3532 which inserts a test signal into the VBI without affecting the active video. The analog switch routes the output of the VITS 3532 into the MPEG-2 encoder 3536 for encoding and transmission. The injector 3534 moves the test signal from the VBI into the active area before the video is encoded. At the receive end 3505, the extractor 5384 moves the test signal from the active area into the VBI and the decoded signal 3585 is routed into two output ports by the analog switch 3556. One port is connected to a VITS and the other to the measurement set 3585 that performs analysis and measurement of the video test signals. The VITS 3557 receives the video test signal 3546 and inserts black into the line that contains the in-service test signal, effectively removing the test signal from the broadcast. The video is then routed back into the analog switch 3544 where it is switched into the subscribers's outbound access line 3562. In this manner, the network 115 is tested end-to-end affecting neither the viewed broadcast not the subscriber's VBI signals or data.

Summarizing, the present invention provides the detection of a test signal located in the vertical blinking interval; extracting the signal and moving it into the active video; concealing the line used to send this test signal; dynamically positioning this line within the viewing area depending upon the area of the screen that we best conceal it; the dynamic positioning can vary several times a second where we place it; and finally, an extractor removes the signal that then provides a continuous signal to the measurement test set even though the test signal is only being sent downstream 2.5 times a second, approximately. The test signal sees a solid continuous signal from the extractor.

While the invention has been described in a specific embodiment, various changes may be made without departing from the spirit and scope of the present invention, as defined in the appended claims, in which:

We claim:

1. In a switched packet network having a plurality of gateways for receiving or transmitting analog broadcast video; each gateway coupled through an analog switch to a source of and/or sink for analog broadcast video; means for encoding/decoding the analog broadcast video in a series of frames as a digital video transport stream in compressed digital form at each gateway; test signal injector means installed in at least one gateway for inserting a test signal in the frames; test signal injection control means for placing and concealing the placement of a video test signal into the frames; and test signal extractor means installed in at least one gateway for locating and extracting the test signal from the frame without impairing the quality of the frame, a switched digital broadcast network for in and out of service testing of analog broadcast video subject to Motion Picture Expert Group-2 (MPEG-2) compression, comprising:

means for monitoring a time code and detecting the presence of a video test signal in each frame and providing a first output signal;

means for examining incoming analog video for motion and scene changes and providing a second output signal;

means for comparing the analog video lines from a current frame with analog video lines from the prior and next frame and scoring the concealment of the video test signal in the frame and providing a third output signal; and means for providing the first, second and third output signals to the test signal injection control means.

2. The switched digital broadcast network of claim 1 further comprising:

means for generating and storing an injector Video Blanking Interval (VBI) test signal table defining the location of a test signal in the VBI of a frame.

3. The switched digital broadcast network of claim 1 further comprising:

means for generating and storing a VBI test signal table and coupling the table to the test signal injection control means.

4. The switched digital broadcast network of claim 3 further comprising:

means for generating a trigger packet coupled to the test signal injection control means and providing an output to the network.

5. The switched digital broadcast network of claim 4 further comprising:

means coupled to the test signal injection control means and the VBI test signal detector for storing the video test signal and injecting the video test signal into the analog video as directed by the test signal injection control means.

6. The switched digital broadcast network of claim 1 further comprising:

means for maintaining continuous connection to each gateway over a TCP/IP network to the gateway equipment and monitor alarm condition in the gateways.

7. The switched digital broadcast network of claim 1 wherein the encoders/decoders implement MPEG-2 encoding/decoding algorithms.

8. The switched digital broadcast network of claim 1 wherein the encoders implement 4:2:0 or 4:2:2 sampling to encode luminance and chrominance components of the video signal.

9. In a switched packet network having a plurality of gateways for receiving or transmitting analog broadcast video; each gateway coupled through an analog switch to a source of and/or sink for analog broadcast video; means for encoding/decoding the analog broadcast video in a series of frames as a digital video transport stream in compressed digital form at each gateway; signal injector means installed in at least one gateway for inserting a signal in the frames; signal injection control means for placing and concealing the placement of the signal into the frames; and signal extractor means installed in at least one gateway for locating and extracting the signal from the frame without impairing the quality of the frame, a switched digital broadcast network for in and out of service testing of analog broadcast video subject to Motion Picture Expert Group-2 (MPEG-2) compression, comprising:

a trigger signal demultiplexer receiving a trigger packet data and coupled to a test signal trigger table;

an intra frame processor responsive to a picture type signal and a group of pictures time code and coupled to the test signal trigger table and a Video Blanking Interval (VBI) line table a test signal and concealment device responsive to a current picture signal; a forward picture signal; a backward picture signal; the picture type signal; the VBI line table and coupled to a test signal line store; and means for combining an output of the test signal line store with a decoded digital video stream whereby the test signal is indicative of the quality of the decoded video stream from a transmission standpoint.

10. The switched digital broadcast network of claim 9 wherein the extractor test signal trigger table comprises:
an entry for each VBI line of a frame, the entry defining the location of the trigger signal in a frame.

11. The switched digital broadcast network of claim 9 wherein the extractor VBI line table comprises:
an entry for each VBI line defining the location of the line in a frame, concealment flag and a concealment mode.

12. In a switched packet network having a plurality of gateways for receiving or transmitting analog broadcast video; each gateway coupled through an analog switch to a source of and/or sink for analog broadcast video; means for encoding/decoding the analog broadcast video in a series of I, B and P frames as a digital video transport stream in compressed digital form at each gateway; test signal injector means installed in at least one gateway for inserting a test signal in the frames; test signal injection control means for placing and concealing the placement of a video test signal into the frames; and test signal extractor means installed in at least one gateway for locating and extracting the test signal from the frame without impairing the quality of the frame, a method of inserting a test signal in a video transmission for assessing video quality wherein the transmission is subject to MPEG-2 compression, comprising the steps of:
a) processing each frame in the injector encoder for a test signal;
b) processing each I frame in the injector encoder;
c) building a trigger packet in the injector and transmitting the trigger packet to the extractor;
d) processing the test signal in an I frame for a concealment mode;
e) calculating a concealment score for each test signal in an I frame;
f) concealing the test signal in the I frame transmitted to the extractor;
g) processing the trigger packet to alert the extractor of a test signal in a received I frame;
h) processing the I frame in the extractor for the test signal;
i) reconstructing each I frame in the extractor; and
j) copying the test signal on every frame to the VBI line under test.

13. The method of claim 12 further processing each frame in an injector, comprising the steps of:
testing a frame for Video Blanking Interval (VBI) lines 10–20, a "no" condition ending the process if no VBI lines are identified; a "yes" condition transferring the process to the next step;
determining a count of trigger packets to be transmitted;
testing each VBI line for the presence of a non-black signal, a "yes" copying the test signal to a test store, a "no" condition imitating I-frame processing; and
terminating the processing of frames after the last VBI line has been processed.

14. The method of claim 12 further processing I-frames in a test signal injector, comprising the steps of:
testing a frame for Video Blanking Interval (VBI) lines 10–20 including test signals, a "no" condition ending the process and clearing a VBI table for that line if no test signals are identified for the tested VBI line; a "yes" condition transferring the process to the next step;
retrieving a motion score for a VBI line including a test signal in an I-frame;
testing the I-frame for to determine if there is high motion or an out-of-sequence I-frame, a "yes" condition initiating a test to determine if the test signal has been sent at least once to an extractor, a "no" condition checking an I-frame count to ensure I-frames have not been suppressed for more than three (3) frames; and
incrementing the I-frame count and returning to the initial process step.

15. The method of claim 12 further building a trigger packet, comprising the steps of:
setting a transmit trigger packet counter=1;
clearing an I-frame counter;
storing a trigger signal time code;
storing a trigger signal concealment mode;
storing a trigger signal video line ID field;
storing a trigger signal VBI line ID field;
testing trigger signal for 4:2:2 format, a "no" condition storing a VBI line count of three (3), a "yes" condition advancing the process to the next step;
storing a VBI line count of 1;
calculating and storing a Cyclic Redundancy Code (CRC);
transmit a trigger packet; and
setting a transmit trigger signal sent flag.

16. The method of claim 12 further concealing a trigger signal in an active video area, comprising the steps of:
determining whether available space exist with an active video area, a "no" condition indicating an overscanned video screen area is fill, a "yes" condition the signal into an overscanned area of a video screen followed by calculating a concealment score and ending the process;
storing a video line separation parameter if the overscanned video area is full;
ranking available video screen safe areas by motion/content;
calculating a concealment score for each video safe area line;
ranking video safe lines by concealment score;
comparing each concealment score against a threshold;
determining if the top concealment score exceeds the threshold, a "yes" condition ending the process, a "no" condition transferring the process to the next step;
ranking the available video safe lines not exceeding the threshold according to motion/content;
calculating a concealment score for ranked available video safe line not exceeding the threshold; and
choosing the top ranked video safe line not exceeding the threshold and ending the process.

17. The method of claim 12 further forming a test signal trigger data structure, comprising the steps of:
generating and storing a time code;
generating and storing a marker to preclude a start code emulation by a multiplexer;
generating and storing a VBI line ID/field from which a test signal is taken;
generating and storing a video line ID/field to which the test signal is moved;

generating and storing a video active area line count indicating whether one (1) or three (3) line to be used in transmitting the test signal;

generating and storing a concealment mode to optimize repair of a taken video line;

generating and storing stuffing bits for the trigger packet; and generating and storing a Cyclic Redundancy Code (CRC).

18. The method of claim 12 further processing a trigger packet in an extractor, comprising the steps of:

checking a trigger packet for a bad CRC, a "yes" condition discarding the packet, a "no" condition transferring the process to the next step;

determining whether an entry exist for a VBI line:
  a "no" condition determining if the time code has expired and discarding the packet if the time code has expired, otherwise creating an new entry in a test signal trigger table;
  a "yes" condition advancing the process to the next step;

determining whether the packet video line=an entry video line, a "yes" condition updating the entry in the test signal trigger table, after which the process ends, a "no" condition advancing the process to the next step;

removing the entry from the test signal trigger table; and creating a new entry in the test signal trigger table, after which the process ends.

19. The method of claim 12 further processing an I-frame in an extractor, comprising the steps of:

determining whether or not an entry exist in a timing signal trigger table:
  a "yes" condition initiates a test to determine if the I-frame code equals the table entry timecode; a "no" condition return the process to start, a "yes" condition initiates the following:
    setting a VBI line active flag;
    clearing I-frame count in a VBI line table;
    setting a conceal flag;
    moving video line ID/field and count into VBI table;
    moving VBI line ID/field into VBI table;
    deleting entry from test signal trigger table and returning to start;
  a "no" condition initiates a test of each entry in the VBI line table, as follows
  a "no" condition ends the process, a "yes" condition advances the process to the next step;
    determining if the a VBI line is active, a no condition returns the process to the previous step, a "yes" condition advances the process to the next step;
    incrementing the I-frame count;
    determining if the I-frame count exceeds three (3), a "no" condition returning the to process to determining if the VBI line is active, a "yes" condition advancing the process to the next step;
    resting the VBI line active flag;
    clearing the test in the test signal store and returning to determining if the VBI line is active.

20. The method of claim 12 further reconstructing a frame in an extractor, comprising the steps of:

determining whether an entry exist in the VBI line table, a "no" condition ends the process, a "yes" condition initiates the next step;

determining if a VBI line is active, a "no" condition returning the process to start, a "yes" condition advancing the process to the next step;

determining whether the I-frame and conceal flags are set, a "yes" condition advances the process to the next step, a "no" condition skipping the next step to the succeeding step;

moving a video line test signal from picture store into test signal store;

copying the test signal from test signal line store to target VBI line/field;

determining whether the I-frame and conceal flag are set, a "no" condition returns the process to start, a "yes " condition advances the process to the next step;

concealing the video line; and clearing the conceal flag.

21. The method of claim 12 further concealing a video line, comprising the steps of:

loading the video line ID/field and count;

loading the concealment mode;

determining whether the concealment mode is in the same line or a prior frame, a "yes" condition moves the video line from the back frame store, after which the process ends, a "no" condition" initiates the following steps:

determining if the same line is in the next frame, a "yes" moving the video line from the forward frame store, after which the process ends, a "no" condition advancing the process the next step;

determining whether the concealment is in the line is above, a "yes" condition moves the video line from current frame store, after which the process ends, a "no" condition advances the process to the next step;

determining if the concealment is going to be in the line below, a "yes" condition moves the video line from the current frame, after which the process ends, a "no" condition advances the process to the next step; and determining to build a composite line, a "no" condition ending the process, a "yes" condition building a composite line by shifting carrier lines and backfilling with the next line, after which the process ends.

* * * * *